(12) United States Patent
Oldroyd

(10) Patent No.: US 8,139,111 B2
(45) Date of Patent: Mar. 20, 2012

(54) HEIGHT MEASUREMENT IN A PERSPECTIVE IMAGE

(75) Inventor: Lawrence Andrew Oldroyd, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 629 days.

(21) Appl. No.: 12/328,043

(22) Filed: Dec. 4, 2008

(65) Prior Publication Data

US 2010/0142748 A1   Jun. 10, 2010

(51) Int. Cl.
*H04N 7/18* (2006.01)
*G06K 9/32* (2006.01)
*G06G 5/00* (2006.01)

(52) U.S. Cl. ............. 348/141; 382/294; 345/619

(58) Field of Classification Search ............ None
See application file for complete search history.

(56) References Cited

U.S. PATENT DOCUMENTS

| | | | |
|---|---|---|---|
| 6,587,601 | B1 | 7/2003 | Hsu et al. |
| 6,677,939 | B2 * | 1/2004 | Uchiyama ............. 345/419 |
| 7,475,357 | B2 * | 1/2009 | Takeuchi et al. ........ 715/769 |
| 2005/0220363 | A1 | 10/2005 | Oldroyd |
| 2006/0215935 | A1 | 9/2006 | Oldroyd |
| 2007/0127101 | A1 * | 6/2007 | Oldroyd ............... 359/24 |

* cited by examiner

*Primary Examiner* — Wen-Tai Lin
(74) *Attorney, Agent, or Firm* — Yee & Associates, P.C.

(57) ABSTRACT

A method, apparatus, and computer program product are present for identifying a location in a scene. An image of the scene is displayed on a display device. A cursor on the image is moved in relation to a number of corresponding directions in a model of the scene in response to a manipulation of a number of controls associated with the cursor. A base location in the scene is identified corresponding to a particular point in response to a user input selecting the particular point in the image. A selected point in the image is selected for the scene and a displacement of the selected point is identified from the base location in response to another user input occurring after an identification of the base location. An offset location in the scene is identified corresponding to the selected point in the image using the base location and the displacement.

24 Claims, 15 Drawing Sheets

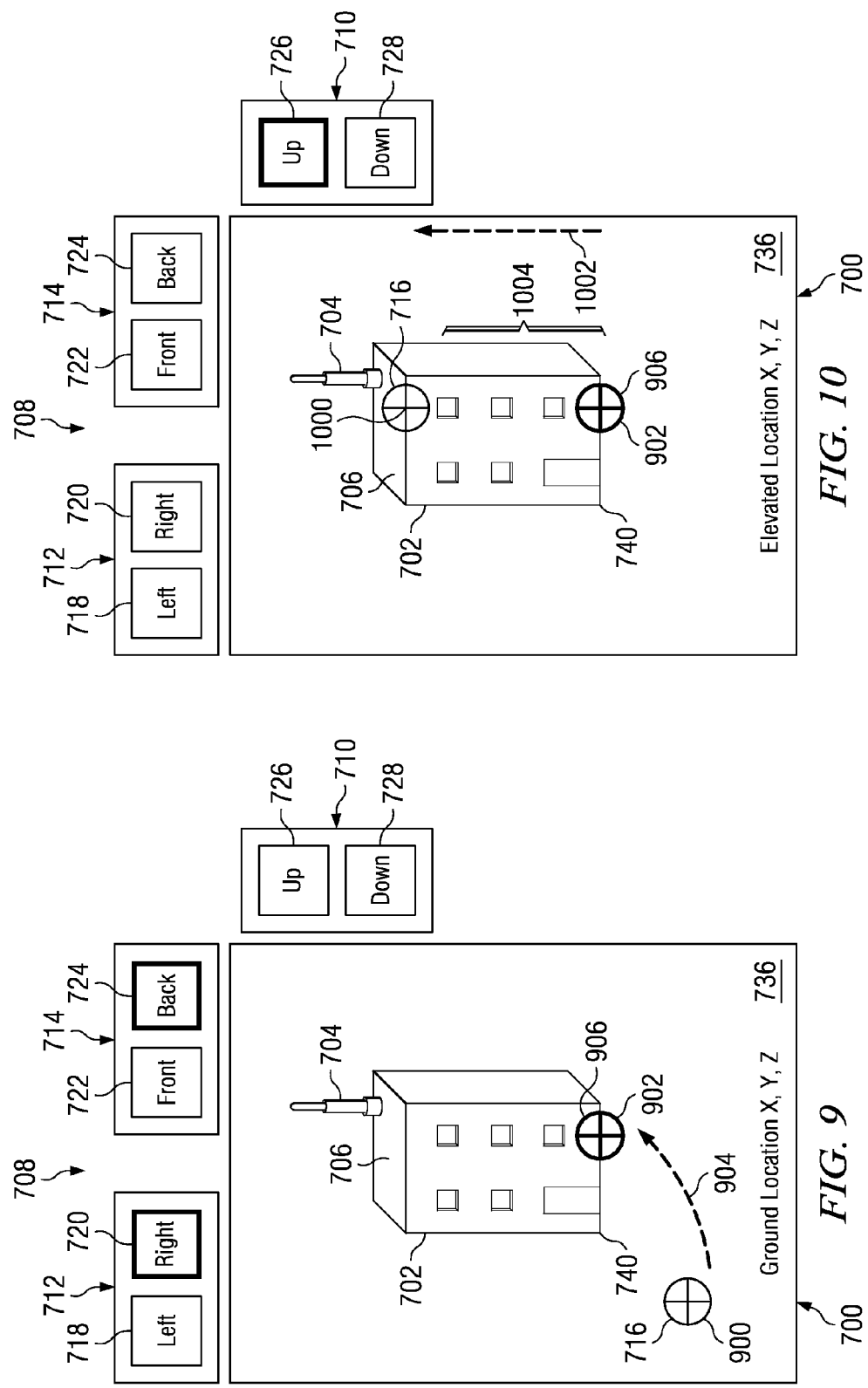

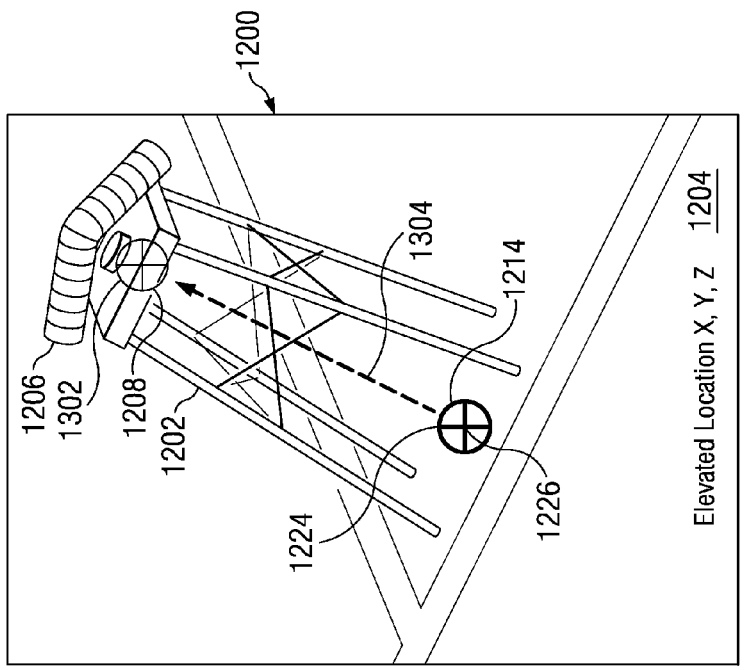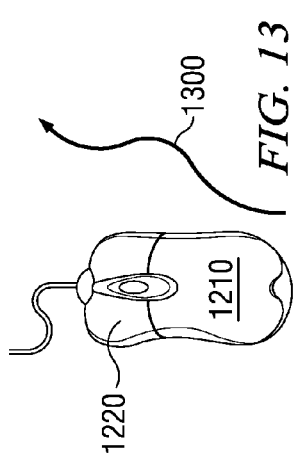
FIG. 13
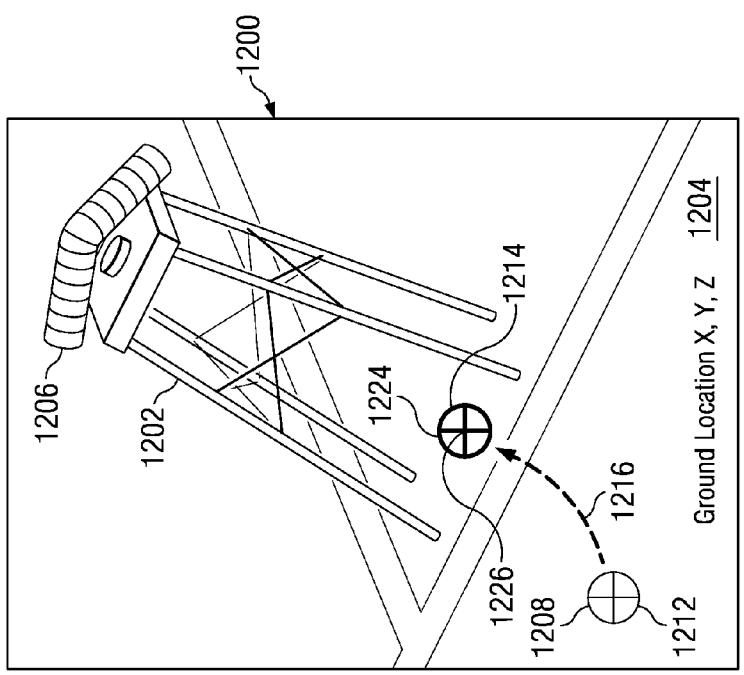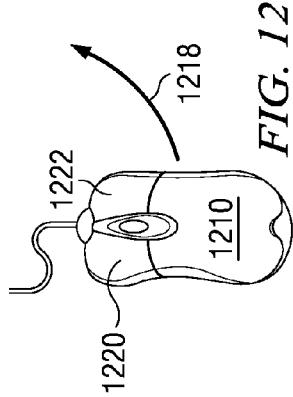
FIG. 12

HEIGHT MEASUREMENT IN A PERSPECTIVE IMAGE

BACKGROUND INFORMATION

1. Field

The present disclosure relates generally to an improved data processing system and in particular, to a method and apparatus for processing data. Still more particularly, the present disclosure relates to a method, apparatus, and computer program product for measuring height in a perspective image.

2. Background

Images of a scene may be generated using various types of sensors. These sensors include, for example, forward looking infrared cameras, synthetic aperture radar systems, video cameras, and other suitable types of sensors. It may be desirable to make measurements of a feature in the image of a scene. Two-dimensional images, however, are unable to convey more than two dimensions of information such as width and depth.

Two-dimensional images also present a perspective distortion due to the means by which they were acquired. For images formed using a lens, such as video cameras or forward looking infrared cameras, this distortion is called perspective. Perspective appears as a scale increase for portions of the image that are closer to the sensor, and a decrease for portions of the image that are more distant. For synthetic aperture radar, the distortion is related to relative heights of the different parts of a scene. Higher parts of the scene are positioned closer to the sensor in the image than lower parts, an effect called foreshortening.

A two-dimensional image, however, may be registered with a spatial model that describes a three-dimensional shape of surfaces in the scene depicted in the image. With registration, individual pixels in the image can be associated with specific three-dimensional locations in the spatial model of the scene. The association is provided by a projection transformation or an inverse projection transformation.

One issue with this type of technique is that sufficiently accurate three-dimensional models of scenes may not be easy to obtain. A model of a scene may include a digital elevation matrix (DEM). A digital elevation matrix is a two-dimensional array of values describing a third coordinate dimension on a scene surface. The values describing elements within the matrix correspond to a location on the surface of the scene. In other words, the values may identify a particular element that contains a value about the location in the scene.

One common example of this type of model provides array locations in a row and column system that is associated with horizontal longitude and latitude locations in the scene. The value at each location in this array is an elevation that is found at that particular latitude and longitude location in the scene. If a location on the surface of the scene cannot be measured for an elevation value or cannot be measured accurately, the corresponding value describing the element for that location is either missing or inaccurate.

This type of association to a three-dimensional model is referred to as being spatially coded. When the scene coordinates are for a geographic coordinate system, this type of model may be referred to as a geocoded or georegistered model or as a geocoded elevation database.

For example, with natural scenes, the model for these scenes is sometimes obtained using a stereo image correlation technique. This type of technique, however, is unable to capture small elevation details or some types of vertical features with accuracy. Edges of vertical faces may be rounded, and small features may be lost entirely or only appear as small lumps. The sharp discontinuities in the surface may cause dissimilarities in the stereo images that may defeat the stereo correlation process for that particular object.

Further, stereo imagery and the amount of data needed to retain the scene model for this technique may also result in these models having a lower spatial resolution for array locations. In other words, the array may cover a larger area of the scene with fewer elevation measurements. Also, these models may be edited to remove some surface detail. For example, a digital terrain elevation database (DTED) available from the United States Government is an example of a geocoded elevation database in which only bare-earth elevations are represented. Thus, tree coverage, buildings, and other vertical features may be removed as contributors to elevation values. These types of models, however, are readily available at no or little cost.

As a result, these types of models do not provide an accurate representation of all features on a surface. These models may provide elevation for the ground, but may not include various vertical features. These vertical features may include, for example, without limitation, trees, towers, buildings, trucks, or other objects that may have elevations.

For example, a digital elevation model may include elevation information for a mountain. A tower on the mountain, however, may not be included in the digital elevation model. As a result, an image of the mountain with the tower cannot be used to obtain a measurement to identify a location of the top of the tower.

As a result, identifying locations in a scene corresponding to an image of the scene may be difficult to perform. For example, if the feature is a tree, a building, or some other object not taken into account in the digital elevation model, the location of those objects cannot be accurately identified even with registration of the image to the digital elevation model.

Therefore, it would be advantageous to have an improved method and apparatus for height measurement in an image.

SUMMARY

In one advantageous embodiment, a method is presented for identifying a location in a scene. An image of the scene is displayed on a display device. A cursor on the image is moved in relation to a number of corresponding directions in a model of the scene in response to a manipulation of a number of controls associated with the cursor. A base location in the scene is identified corresponding to a particular point in response to a user input selecting the particular point in the image. A selected point in the image is selected for the scene and a displacement of the selected point is identified from the base location in response to another user input occurring after an identification of the base location. An offset location in the scene is identified corresponding to the selected point in the image using the base location and the displacement.

In another advantageous embodiment, an apparatus comprises a display device and processor. The processor is configured for displaying an image of a scene on the display device. The processor is further configured for moving a cursor on the image in relation to a number of corresponding directions in a model of the scene in response to a manipulation of a number of controls associated with the cursor. The processor is configured for identifying a base location in the scene corresponding to a particular point in response to a user input selecting the particular point in the image. The processor is configured for selecting a selected point in the image for the scene and identifying a displacement of the selected point from the base location in response to another user input occurring after an identification of the base location. The processor is also configured for identifying an offset location in the scene corresponding to the selected point in the image using the base location and the displacement.

In another advantageous embodiment, a computer program product is present for identifying a location in a scene. The computer program product comprises a computer recordable storage medium, and program code stored on the computer recordable storage medium. Program code is present for displaying an image of the scene on a display device. Program code is present for moving a cursor on the image in relation to a number of corresponding directions in a model of the scene in response to a manipulation of a number of controls associated with the cursor. Program code is present for identifying a base location in the scene corresponding to a particular point in response to a user input selecting the particular point in the image. Program code is present for selecting a selected point in the image for the scene and identifying a displacement of the selected point from the base location in response to another user input occurring after an identification of the base location. Program code is also present for identifying an offset location in the scene corresponding to the selected point in the image using the base location and the displacement.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 9 is a diagram illustrating horizontal and vertical movements in an image in accordance with an advantageous embodiment;

FIG. 10 is a diagram illustrating horizontal and vertical movements in an image in accordance with an advantageous embodiment;

FIG. 12 is a diagram illustrating measuring a point in a tilted image in accordance with an advantageous embodiment;

FIG. 13 is a diagram illustrating measuring a point in a tilted image in accordance with an advantageous embodiment;

DETAILED DESCRIPTION

Figure 1:
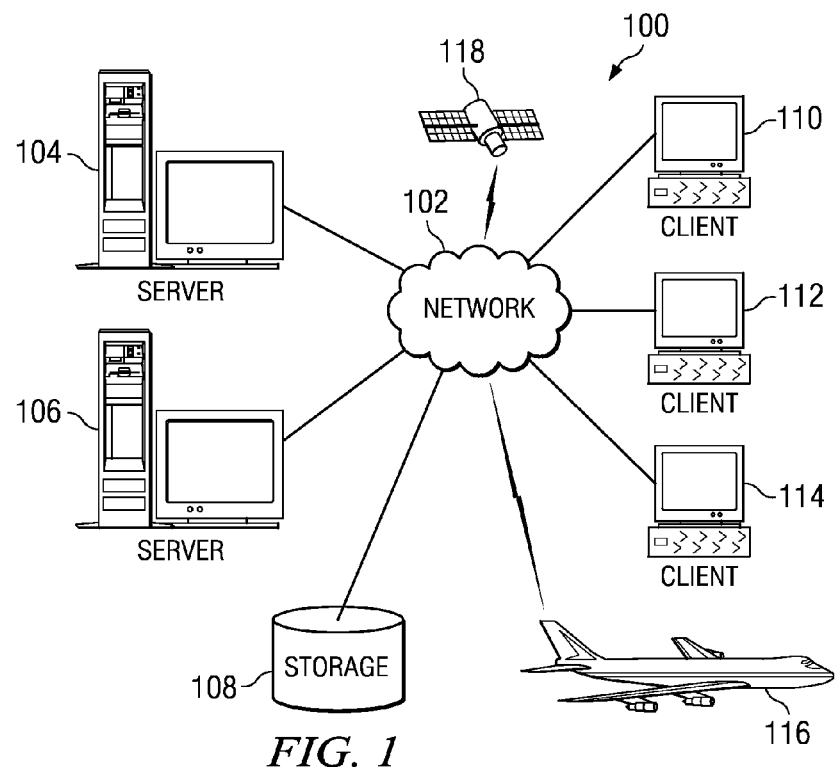
FIG. 1 is a pictorial representation of a network of data processing systems in which advantageous embodiments may be implemented.
Figure 2:
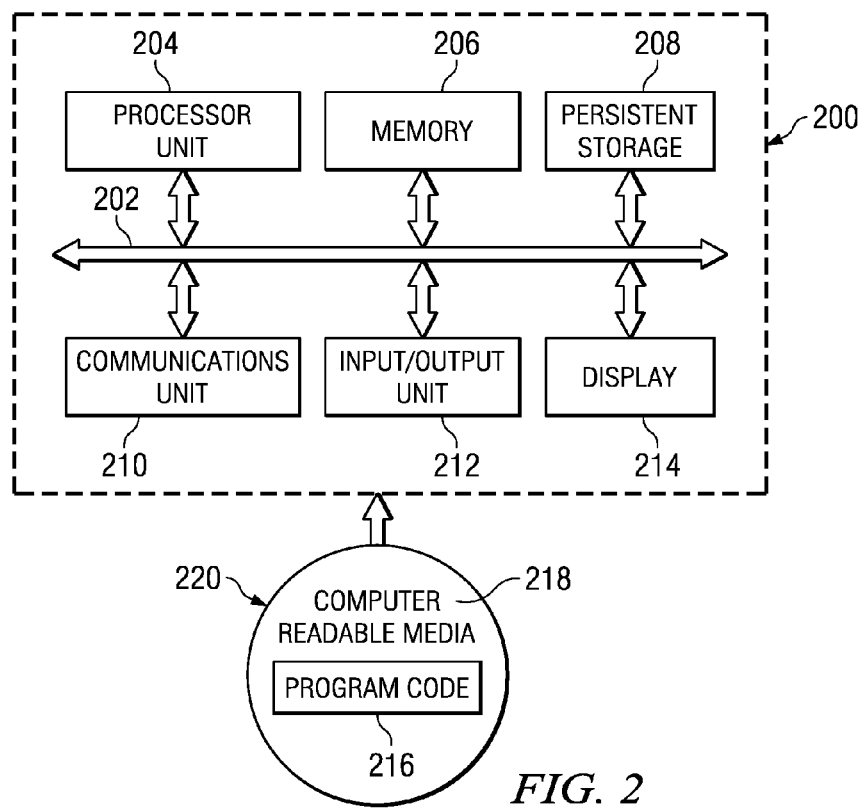
FIG. 2 is a diagram of a data processing system in accordance with an illustrative embodiment.

With reference now to the figures and in particular with reference to FIGS. 1-2, exemplary diagrams of data processing environments are provided in which the advantageous embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114.

Aircraft 116 and satellite 118 also may exchange information with servers 104 and 106. Aircraft 116 may exchange data with different computers through a wireless communications link while in-flight or any other type of communications link while on the ground. Satellite 118 also may exchange data with different computers and devices through a wireless communications link while in space. In these examples, server 104, server 106, client 110, client 112, and client 114 may be computers. Network data processing system 100 may include additional servers, clients, and other devices not shown.

Different advantageous embodiments may be employed within network data processing system 100 to identify elevations for various vertical features in a scene. The different advantageous embodiments may use one or more of the different data processing systems and devices to obtain vertical measurements and identify locations within a scene using an image of the scene.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment. Data processing system 200 is an example of a data processing system that may be used to implement servers and clients, such as server 104 and client 110. Further, data processing system 200 is an example of a data processing system that may be found in aircraft 116 and satellite 118 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form. In yet another, a bus system may be used to implement communications fabric 202 and may be comprised of one or more buses, such as a system bus or an input/output bus.

Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize that it is often desirable to measure a location of a feature found in an image taken of a scene. In these examples, an image contains data for a scene. A scene is something that may be viewed by a viewer. A scene may be an actual geographic location. For example, a scene may be a mountain, a city, a street, a field, or some other suitable geographic location. In other examples, the scene may be a portion of an object, such as an aircraft wing assembly, an open bay of a satellite in orbit, or some other feature being imaged for the measurement of locations in the scene. The different advantageous embodiments also recognize that the image of the scene is taken from the vantage of a viewpoint of the sensor used to capture the image. This image may be, for example, a still image and/or from video.

In many cases, it is desirable to measure a location for a feature in the scene as found in the image of the scene. This location may be for a feature such as, for example, a window in a building, the top of a tower, a truck, or some other suitable object.

The different advantageous embodiments recognize that the identification of the location may be possible if the image is geocoded. In other words, if the particular point in the image containing the object is associated with a geographic coordinate system, then the location may be identified. Geocoding of an image may be performed using image registration. Geocoding associates location measurement values with each pixel. A geocoded image has an association with the real world of the scene portrayed in the image. Image registration associates pixel addresses between two images.

The different advantageous embodiments recognize that once a sensor image is geocoded, the different pixels in the image are associated with a three-dimensional coordinate location in the coordinate system used to describe the scene. This type of geocoding, however, may be limited by the accuracy and completeness of the model used for registration.

If the image of the scene contains a feature with a point that coincides with an inaccurate or incomplete measurement in the model of the scene, the geocoding of the pixels associated with that feature also becomes inaccurate. For example, if a vertical man-made feature, such as a building, is present in an image, this image may be geocoded with a digital terrain elevation database. The building, however, is not present in this type of model of the scene. As a result, the geocoding of pixels depicting the building will be inaccurate.

Inaccuracy in the geocoding is usually identified by the user observing features in an image of the scene, together with knowledge of how the elevation dataset involved was constructed. When an elevation dataset is constructed, information may be produced concerning accuracy. For example, if measurements of elevation are collected by stereo correlation, the correlation coefficient will be high for points obtaining accurate matches, and low for less accurate matches, and/or near zero for failed matches.

The correlation coefficient value, or a quality flag, could be associated with the elevation measurement for each point at which a stereo correlation was performed. This association may be performed in cases where the correlation failed, and an elevation value had to be obtained by interpolation from neighboring elevation measurements. Alternatively, a sentinel value indicating failure of correlation, or unknown elevation, may be associated with those locations in which correlation failed. Most elevation datasets are known for the techniques by which they are constructed. These techniques are understood by the users of the data, in these examples.

For stereo derived elevation models, users understand the failings of stereo collection. Thus, these users can tell by viewing an image of a scene the points at which a good measure of elevation may exist, and the points at which a good measure of elevation may not exist. A good measure is one in which the measurement can be made for other uses, such as identifying a location in the scene.

For elevation data derived from the recent Space Shuttle Radar Topography Mission, using radar interferometry to obtain elevations, less knowledge is present among users, as the data is only recently becoming available. Fortunately, there is substantial commonality between the collection methods, so that users of both elevation data forms share some understanding of points where good measurements may be found. These points provide starting points for measurements performed under these advantageous embodiments.

For example, with a Digital Terrain Elevation Data dataset from the United States Government, the elevation data portrays ground elevations, so the pixels shown representing the sides and the top of the building may have an elevation of the base of the building at that geographic location. As another example, with the stereo-derived digital elevation model, elevation values of narrow vertical structures, such as poles or towers, and points near sharp vertical rises or occluded edges, may generally be inaccurate.

Thus, the different advantageous embodiments provide a method and apparatus for identifying locations of objects that cannot be properly represented when geocoding is performed on an image of a scene. The different advantageous embodiments may display an image of a scene on a display device. A user input may be received selecting a first point in the image.

In response to the selection of the first point, a base location in the scene may be identified that corresponds to the first point. Responsive to a subsequent user input selecting a selected point in the image for the scene, a displacement is identified from the base location. An offset location in the scene corresponding to the selected point in the image is identified using the base location and the displacement.

Figure 3:
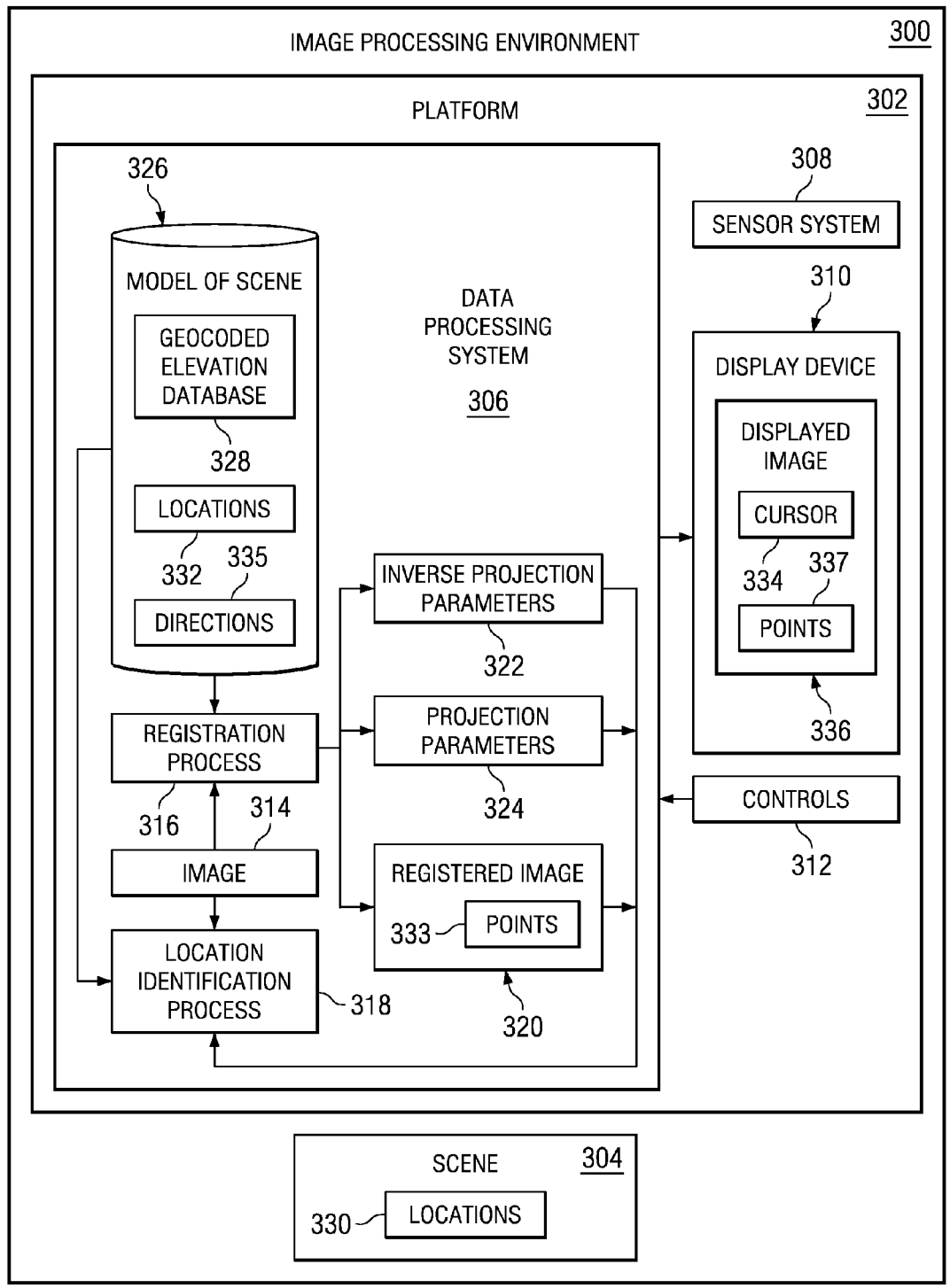
FIG. 3 is a diagram of an image processing environment in accordance with an advantageous embodiment.

With reference now to FIG. 3, a diagram of an image processing environment is depicted in accordance with an advantageous embodiment. Image processing environment 300 may be implemented using computers and devices such as those found in network data processing system 100 in FIG. 1 and data processing system 200 in FIG. 2. In this example, image processing environment 300 and platform 302 may collect information about scene 304.

Platform 302 may include data processing system 306, sensor system 308, display device 310, and controls 312. Platform 302 may take various forms. For example, platform 302 may be a mobile platform, a stationary platform, a land-based structure, an aquatic-based structure, a space-based structure and/or some other suitable platform or structure. More specifically, platform 302 may be, for example, without limitation, an aircraft, a surface ship, a tank, a personnel carrier, a train, a spacecraft, a space station, a satellite, a submarine, an automobile, a power plant, a bridge, a dam, a manufacturing facility, a human operator, a building, and/or some other suitable object. In this example, platform 302 may be aircraft 116 in FIG. 1.

Data processing system 306 may be implemented using a data processing system such as, for example, data processing system 200 in FIG. 2. Sensor system 308 may take various forms. For example, sensor system 308 may be a number of sensors such as, for example, at least one of a forward looking infrared camera, a synthetic aperture radar system, a video camera, an X-ray imager, a computer tomography scanner, a telescope camera, or some other suitable sensor that is capable of generating images.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

Sensor system 308 may generate data for image 314. In these examples, image 314 may be a two-dimensional perspective image of scene 304. Scene 304 covers a geometric region, such as that on the earth. For example, scene 304 may cover a city, a city block, a meadow, a highway, an island, a continent, or any other suitable geographic area.

Data processing system 306 executes registration process 316 and location identification process 318. These processes may be used to process image 314. Location identification process 318 may display image 314 on display device 308 and perform operations on image 314 based on user input received from controls 312. Registration process 316 may process image 314 to generate registered image 320 from image 314, inverse projection parameters 322, and projection parameters 324.

Registration process 316 uses model of scene 326 to generate registered image 320, create inverse projection parameters 322, and generate projection parameters 324. Inverse projection parameters 322 convert from two-dimensional images of scenes to three-dimensional spatial models. Inverse projection parameters 322 may include information about the projected third dimension coordinate needed to accompany the column and row image coordinate values to complete the inverse projection calculation. Alternatively, the inverse projection may use an algorithm to calculate the three-dimensional coordinate by intersecting a line of sight for the pixel with model of scene 326. In these examples, model of scene 326 is a three-dimensional model. Projection parameters 324 convert from three-dimensional spatial models to two-dimensional models of scenes.

Model of scene 326, in this depicted example, takes the form of geocoded elevation database 328. In other words, the information in model of scene 326 may contain geographic coordinate measurements for scene 304. These geographic coordinate measurements are typically in latitude, longitude, and elevation. More specifically, locations 330 in scene 304 may be stored as information in the form of locations 332 in model of scene 326.

As a result, points 333 in registered image 320 correspond to locations 332 within model of scene 326. Each pixel is located at a particular point in registered image 320. These points are typically defined using a row and column system. In this manner, a selection of a point in points 333 in registered image 320 may be used to identify a particular location within locations 332.

The different advantageous embodiments provide a capability to identify locations for points 333 within registered image 320 that do not have corresponding locations within locations 332.

In the different advantageous embodiments, location identification process 318 provides for movement within registered image 320 in a manner that corresponds to directions 335 within model of scene 326. In other words, controls 312 may be configured such that a user is capable of moving cursor 334 on displayed image 336 in a manner that corresponds to movements relative to model of scene 326. Displayed image 336 is a display of registered image 320 on display device 310.

For example, controls 312 may provide horizontal movement and vertical movement. These types of movements are with respect to directions 335 within model of scene 326 and not necessarily with respect to those directions in displayed image 336. In other words, a horizontal movement generated by manipulating controls 312 may not be a horizontal movement in displayed image 336. This horizontal movement is with respect to directions 335 in model of scene 326.

When a horizontal movement is performed, the movement of cursor 334 moves to different points 337 on displayed image 336 that correspond to locations within locations 332 in a horizontal direction. When vertical movement occurs, the movement of cursor 334 is in a vertical direction with respect to directions 335 within model of scene 326.

In other words, controls 312 are configured to move cursor 334 with respect to directions 335 within model of scene 326. This movement is translated into movement of cursor 334 on displayed image 336 that corresponds to the directions within model of scene 326.

For example, if controls 312 are manipulated to move cursor 334 up the side of a building displayed on displayed image 336, cursor 334 is moved in a vertical direction on the building within the image relative to the directions within model of scene 326. In other words, a vertical movement does not necessarily correspond to a vertical movement of cursor 334 on displayed image 336. For example, if displayed image 336 has a tilted view of the building, then a vertical movement with respect to model of scene 326 may not result in an upward or vertical movement of cursor 334 on displayed image 336.

The illustration of image processing environment 300 in FIG. 3 is not meant to imply physical and/or architectural limitations to the manner in which other advantageous embodiments may be implemented. In some advantageous embodiments, other components in addition to or in place of the ones illustrated may be used. Further, in some advantageous embodiments, some of the components illustrated may be unnecessary.

In some advantageous embodiments, sensor system 308 may be located on a different platform from platform 302. With this type of implementation, sensor system 308 may obtain data for image 314, while platform 302 may process image 314. In still other advantageous embodiments, model of scene 326 may be located on a different data processing system from data processing system 306. Model of scene 326 may be located at a remote location such as, for example, a ground platform or a space-based platform.

Figure 4:
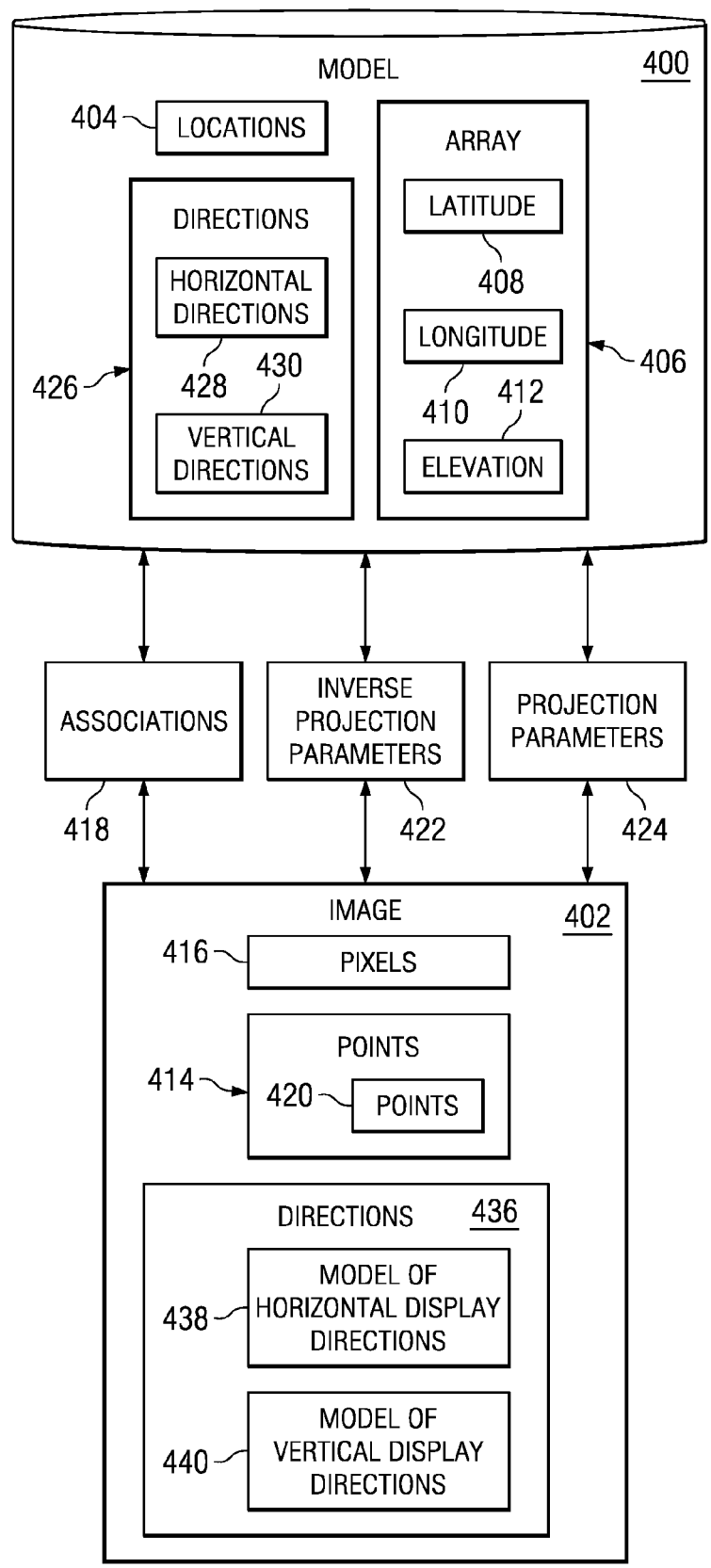
FIG. 4 is a diagram illustrating a relationship between a model of a scene and an image in accordance with an advantageous embodiment.

With reference now to FIG. 4, a diagram illustrating a relationship between a model of a scene and an image is depicted in accordance with an advantageous embodiment. In this example, model 400 is an example of one implementation of model of scene 326 in FIG. 3. Image 402 is an example of an image of a scene such as, for example, scene 304 in FIG. 3.

In this example, model 400 contains locations 404 corresponding to locations within a scene. Model 400 may contain array 406 for locations 404. Array 406 takes the form of a two-dimensional array in which latitude 408 and longitude 410 may be used to locate elements within array 406. Each element within array 406 contains elevation 412 in these examples.

Array 406 may be a three-dimensional array when multiple elevations are present. For example, a particular location within locations 404 may have multiple elevations for different features. As one example, a building may have a base and multiple windows above the same base point for a particular location. This type of feature may result in multiple elevations for the same latitude and longitude. Each elevation for the same latitude and longitude may be assigned to a different element.

In these examples, each point in points 414 is associated with a particular portion of image 402. In the different illustrative examples, points 414 correspond to pixels 416 in image 402. In these examples, each of points 414 may identify a particular pixel within pixels 416 based on a row and column identification for image 402. Points 414 in image 402 may be associated with locations 404 to form associations 418. This type of association may be performed using registration process 316 in FIG. 3 and results in image 402 becoming a registered image. This type of image is also referred to as a geocoded image. However, points 420 within points 414 may not be associated with a location within locations 404. Identification of locations for points 414 may be performed using a location identification process, such as location identification process 318 in FIG. 3.

In this illustrative example, model 400 takes the form of a geocoded elevation database. This geocoded elevation database may be implemented using a number of different currently available databases. For example, a geocoded elevation database may be a digital terrain elevation database, a stereo-derived digital elevation model produced using stereo imagery from aerial or satellite photographic land surveys, or some other suitable model of a scene.

This registration of image 402 with model 400 also may generate inverse projection parameters 422 and projection parameters 424. Inverse projection parameters 422 are used to identify a location from locations 404 in response to selecting a point in points 414. Projection parameters 424 may be used to identify a point within points 414 based on a particular location within locations 404. Image registration is used in software relating to geographic information systems, map making, and geographic measurements. Registration processes are also used in a variety of applications in which small images are stitched together into a single mosaic image covering the extent of the collection. Examples of currently available software employing registration include, for example, Softplotter from The Boeing Company, Socet Set from BAE Systems, TerraSight from Pyramid Vision, a Sarnoff Company, and ARCInfo from ESRI. In all of these products, a three-dimensional model of a scene area is registered with an image of the area.

In the registration process, a set of control points is established. Each control point in the set of control points represents a pixel point in the image and a location in the model database. The pixel point and the location of the control point represent the same point in the scene. An initial set of projection parameters for the image are initialized to some standard value. An iterative statistical adjustment process is performed that uses the projection parameters to transform the model locations of the control point set into an approximation of the corresponding image coordinate values.

On each iteration, the differences between the approximate image coordinate values and the image coordinate values in the control point set are evaluated to obtain a closeness of fit measure. The differences are also used to adjust the parameters of the projection so the subsequent iteration will produce smaller differences. The iterations continue to be performed until the differences are sufficiently small that an adequate closeness of fit is observed. The closeness of fit that may be required may vary depending on the particular implementation.

According to an advantageous embodiment, the resulting projection may be from a spatial model to an image. The projection and corresponding inverse projection are used to determine a registration which provides a spatial coding for the image. For example, the spatial model may be a three-dimensional geographic model of a scene, and the projection and inverse projection provide a three-dimensional geocoding for the image of the scene. Projection parameters 424 may be recorded in projection parameters 324 of FIG. 3.

The inverse projection may be from three-dimensional image coordinates (C,R,W) to three-dimensional spatial location coordinates (X,Y,Z). The image row and column indices R and C may be the first two of three image coordinates. The third image coordinate W represents a distance of the projected point from the image plane and may be referred to as a projected W value, which causes the inverse projection to calculate location coordinates (X,Y,Z). This location (X,Y,Z) may be the same that is transformed by the projection into the corresponding (C,R,W) coordinates. Inverse projection parameters 422 may be recorded in inverse projection parameters 322 of FIG. 3. Inverse projection parameters 322 of FIG. 3 may contain a projected W value for each pixel location (C,R) in points 414 and in associations 418.

The inverse projection may alternatively transform two-dimensional image coordinates (C,R) into three-dimensional spatial location coordinates (X,Y,Z). Since this transformation is under-determined, no direct calculation is possible. Instead, the projection parameters 324 in FIG. 3 may be used to obtain the equation of a line of sight from a pixel at position (C,R) in the image through the projection focal point.

In one example projection, the pixel position may be taken in the image plane at position (C, R, 0), and the projection focal point may be taken in image coordinates at $(0, 0, \lambda)$, in deriving the line equation. The line of sight may then be intersected with the three-dimensional model of scene 326 of FIG. 3, to obtain a location (X,Y,Z) to be the inverse projection result. These methods are all known in the fields of computer graphics, robotics, and computer vision.

An example projection used in determining image registration may be the pinhole projection model used in computer graphics. This projection model appears in several similar forms, such as that in the OpenGL graphics system, found in the "OpenGL Programming Guide, $3^{rd}$ Edition", p. 123ff and p. 674, or in Pavlidis "Algorithms for Graphics and Image Processing", p. 370ff, or in Foley and Van Dam "Fundamentals of Computer Graphics", p. 274ff.

In one example, a pinhole projection may be a homogenous transform represented as a 4×4 matrix, containing values 1.0 on the diagonal and zero in all other locations, except in the $4^{th}$ row, $3^{rd}$ column location, which contains the negative reciprocal of the focal point length from the image plane to the pinhole, in the same units as the coordinate axes. This representation projects points from an image coordinate system with origin at the center in the image plane, to the same coordinate system.

Coordinates of projected points are modified in a way that models the geometrical effects of projective distortion in a pinhole camera. For realization of the projection of a sensor system, this matrix is multiplied by various other matrices. These matrices represent the relative positioning and scaling of the image coordinate system with respect to a coordinate system in which scene location coordinates are presented. Projection of a location (X,Y,Z) in the scene to a projected point (C,R,W) in image coordinates is done by multiplying the projection matrix times the location coordinates, presented as a column vector in homogenous coordinate form on the right side of the matrix. The projection matrices, coordinate transformations, and homogenous coordinate representations which may be used are well known in the fields of digital computer graphics, robotics, and computer vision.

The inverse projection in the example representation is the matrix inverse of the projection matrix, and may include the inverses of matrices multiplied with the projection matrix. The result of this multiplication is a matrix for performing the inverse projection from image row and column coordinates R, C, to scene X, Y, Z coordinates. Use of the inverse projection also employs a projected W value associated with the image R and C coordinates. This association of the projected W value with the R and C coordinates is used to establish a unique X, Y, Z scene coordinate for each (C,R) pixel position.

Inverse projection of an image point (C,R) employs the projected W value associated with image point (C,R) to form a projected point (C,R,W). This projected point is then multiplied by the inverse projection matrix, to obtain a scene location (X,Y,Z). Inverse projection matrices, coordinate transforms, and homogenous coordinate forms are well understood in the area of graphics and image processing.

Projected W values may be obtained in the different advantageous embodiments. Projected W values may be provided as part of the inverse projection parameters 322 in FIG. 3. Alternatively, projected W values may be calculated by projecting selected scene locations and recording the values in inverse projection parameters 322 of FIG. 3.

In yet another example, the inverse projection may be used to establish an equation for a line of sight from the pixel into the scene model, and an intersection between the line of sight and the three-dimensional model used to obtain the proper X, Y, Z scene coordinate. These various methods also are known in the fields of computer graphics and computer vision.

In these examples, user interaction to identify locations 404 may have directions 426. These directions are relative to model 400. For example, directions 426 may include horizontal directions 428 and vertical directions 430. Horizontal directions 428 may be directions relative to latitude 408 and longitude 410. Vertical directions 430 may be directions relative to elevation 412.

Image 402 may also have directions 436. These directions are relative to image 402. Each direction within directions 436 is associated in associations 418 with direction 426 in model 400. A direction within directions 436 also defines the direction in image 402 that a cursor can move in response to movement in direction 426 of model 400.

Directions 436 are used to identify cursor movement directions in row and column coordinates needed to reflect corresponding directions in directions 426 of model 400. For example, directions 436 may include model of horizontal display directions 438 and model of vertical display directions 440. Model of horizontal display directions 438 may specify image 402 cursor movement directions in row and column coordinates needed to cause cursor motion in image 402 to reflect motion in horizontal directions 428 relative to model 400. Model of vertical display directions 440 may specify image 402 cursor movement directions in row and column coordinates needed to cause cursor motion in image 402 to reflect motion in vertical directions 430 relative to model 400.

Figure 5:
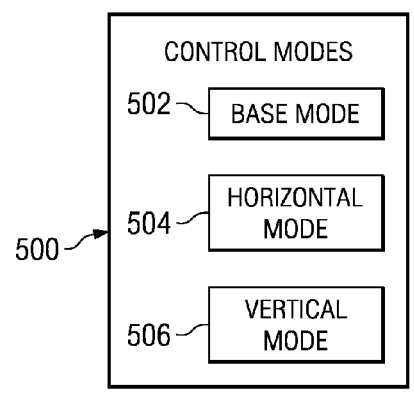
FIG. 5 is a diagram illustrating control modes in accordance with an advantageous embodiment.

With reference now to FIG. 5, a diagram illustrating control modes is depicted in accordance with an advantageous embodiment. In this example, control modes 500 is an example of different modes of control that may be implemented in a software component such as location identification process 318 in FIG. 3. These different modes are employed by this process to control the movement of a cursor in response to user input to controls. Control modes 500 include, for example, base mode 502, horizontal mode 504, and vertical mode 505.

Base mode 502 may allow for a cursor to move along a base with a known elevation. This base may be, for example, the ground, a rooftop, a bridge, or some other suitable location for which an elevation is known. Horizontal mode 504 provides a capability to move a cursor in a horizontal direction for the model. This horizontal movement is correlated to an appropriate movement of the cursor on the image of the scene being displayed.

Further, horizontal mode 504 also may provide a capability to identify horizontal offsets from one location to another location. Horizontal mode 504 retains a constant elevation value for all scene locations to which motion is made, while horizontal mode 504 remains in effect. The constant elevation value is retained without regard to any location values that may be associated with pixels to which cursor motion is made while horizontal mode 504 remains in effect. The elevation value may vary when horizontal mode 504 is not in effect.

Vertical mode 506 provides a capability to take user input moving a cursor in a vertical direction for a model of a scene to generate an appropriate movement of a cursor on an image of the scene. Further, this mode also provides a capability to identify offsets between different vertical points. These offsets may be used to identify a location that is not present or not accurately represented by the model of the scene.

In a horizontal mode, corresponding horizontal movement and identification of horizontal displacement may be performed. In a vertical mode, vertical movement and identification of vertical displacement may be performed with respect to the scene. In these examples, only one mode may be in operation at any one time. The different modes may be identified through various indicators. The indicators may be present in the display or through a change or some graphical indicator associated with the cursor.

For example, the change in the shape of the cursor may be used to identify the mode. In other advantageous embodiments, a change in color, or other features of a cursor may be used. In each of these modes, movement of the cursor results in a location being calculated for the particular pixel on which the cursor sits. The position of this pixel is referred to as a point in these examples.

Figure 6:
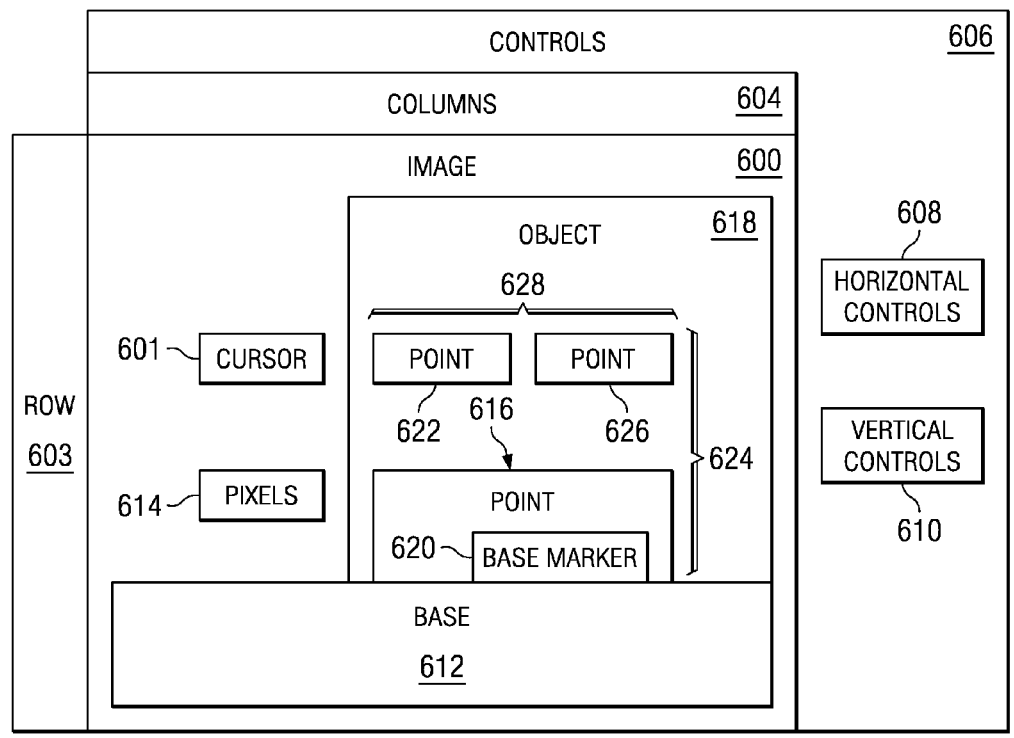
FIG. 6 is a diagram illustrating an example of a display with controls in accordance with an advantageous embodiment.

With reference now to FIG. 6, a diagram illustrating an example of a display with controls is depicted in accordance with an advantageous embodiment. In this example, image 600 is an example of an image that may be displayed in a display device such as, for example, display device 310 in FIG. 3.

Cursor 601 may be displayed on image 600. Input may be received to move cursor 601 to different points identified by rows 603 and columns 604 through controls 606. In these examples, controls 606 include horizontal controls 608 and vertical controls 610. User input to controls 606 is managed by a location identification process in relation to a number of corresponding directions in a model of the scene. Movement in the corresponding directions in the model of the scene is translated to movement by rows 603 and columns 604 in image 600.

Controls 606 may be implemented in a number of different ways. For example, these controls may be buttons in a bezel around a display device. Different buttons may provide for different controls for the different modes. Further, other controls 606 may take other forms including, for example, a mouse, a joystick, a touch screen display, and/or some other suitable type of control.

Horizontal controls 608 may move cursor 601 on image 600 relative to a horizontal direction for the model of the scene. Vertical controls 610 may move cursor 601 along a vertical direction for the model of the scene. In other words, movement of cursor 601 in these axes may be converted into rows 603 and columns 604 for image 600 relative to directions for the model of the scene. A location identification process performs the translation of movement between rows 603 and columns 604 in image 600 with horizontal directions and vertical directions in the model of the scene. This translation may be identified based on the association of pixels with locations or the association of directions 426 in model 400 with directions 436 in image 402 in FIG. 4.

A user may move cursor 601 along base 612 of image 600. Base 612 is typically the ground. In other advantageous embodiments, base 612 may be any point on image 600 in which the pixel at that point is associated with a location in a model of the scene. In other advantageous embodiments, base 612 may be, for example, a rooftop of a building, a bridge, or some other suitable object for which a location is present within a model of a scene. Base 612 is a number of locations that have been associated with points in an image.

User input may be received to select point 616 along base 612. Point 616 may be at the base of object 618. This selection results in base marker 620 being displayed on image 600 at point 616.

A user may then move cursor 601 vertically using vertical controls 610 such that cursor 601 moves upward or downward with respect to base 612 and in a vertical direction within vertical directions 430 relative to model 400 in FIG. 4. Cursor 601's motion in image 600 would be in the vertical direction within model of vertical display directions 440 of the scene relative to image 402 in FIG. 4.

Movement of cursor 601 along object 618 may occur as a vertical movement from point 616 to point 622. Displacement 624 between point 616 and point 622 may be identified. Point 616 in image 600 is associated with a location within a model of the scene, while point 622 does not have a location within the model of the scene. Point 616 has the same horizontal coordinates as point 622, but no known elevation is known for point 622. Displacement 624 between point 616 and point 622 may be identified to generate a location for point 622. This new location may be added to locations in the model of the scene or may be just temporarily used.

Further, horizontal movements may be made along horizontal directions with similar displacements being identified. Multiple horizontal and vertical movements may be made with respect to base 612. The displacements of each movement may be used to identify locations at each selected point.

For example, after the vertical movement to point 622, a horizontal movement to point 626 may be made to identify a location for point 626, which may not be associated with a location in a model of the scene.

The illustration of the controls and manipulation of cursor 601 in image 600 in FIG. 6 is presented for purposes of illustrating one manner in which an image may be manipulated. This illustration is not meant to imply physical or architectural limitations to the manner in which other advantageous embodiments may be implemented.

Figure 8:
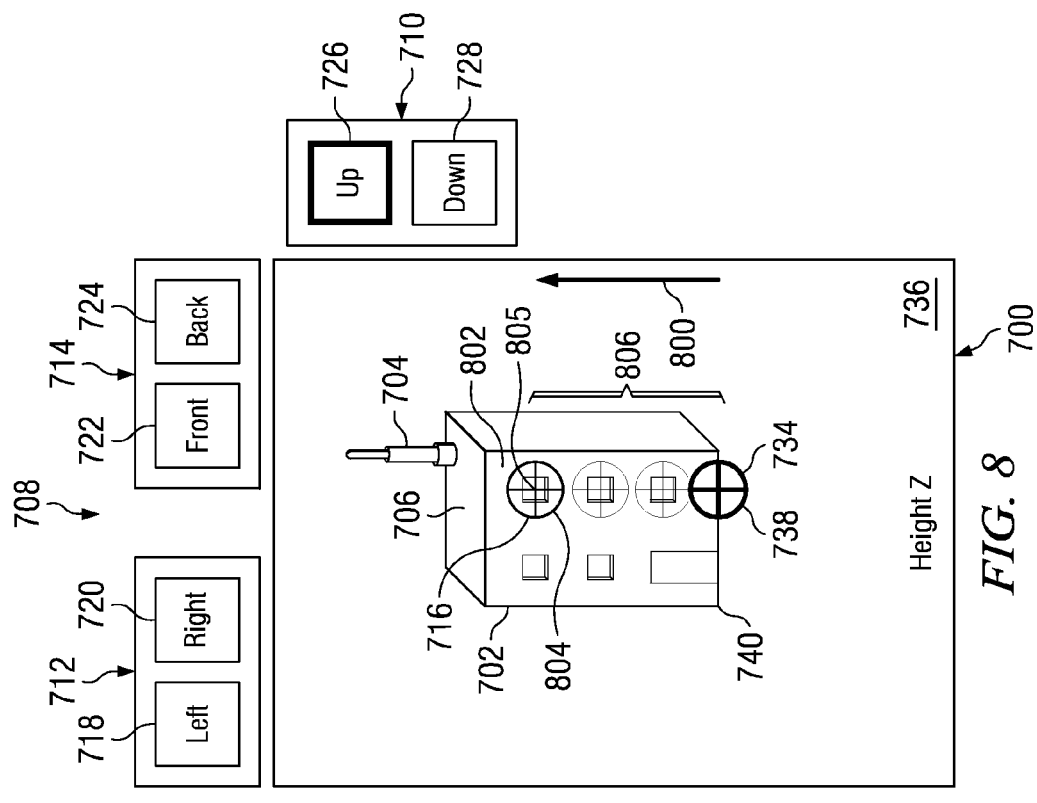
FIG. 8 is a diagram illustrating vertical movement in a scene in accordance with an advantageous embodiment.
Figure 7:
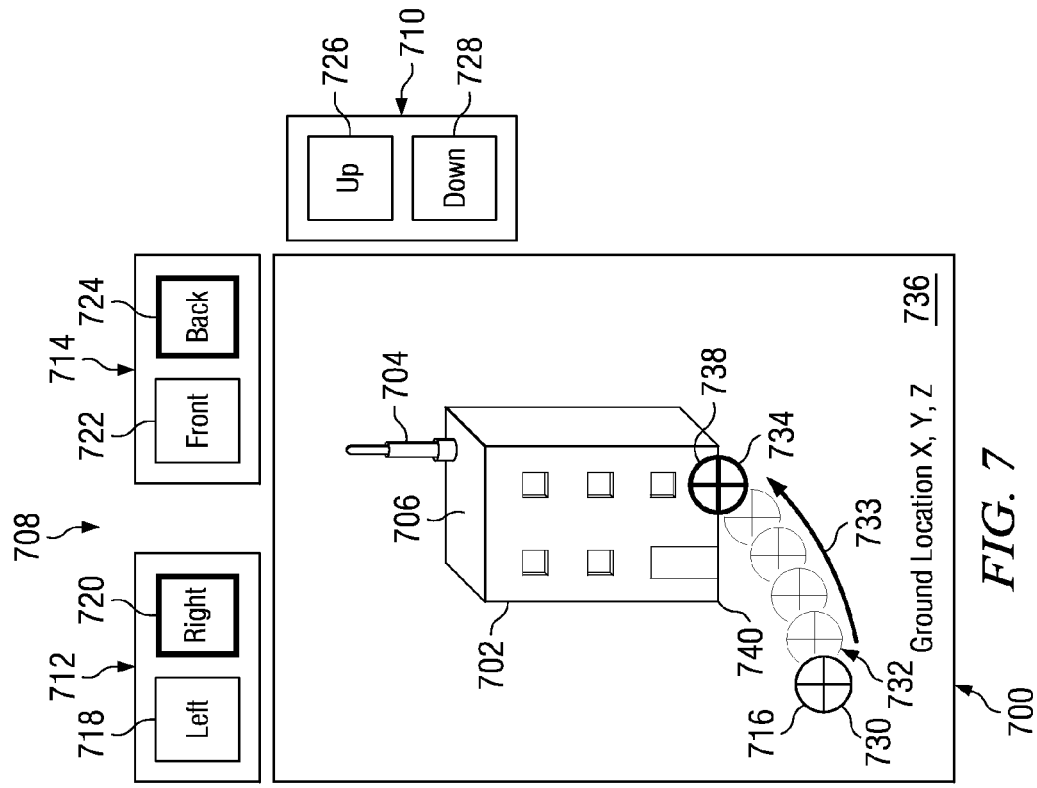
FIG. 7 is a diagram of a building in accordance with an advantageous embodiment.

With reference now to FIGS. 7-8, diagrams illustrating measuring a vertically offset point are depicted in accordance with an advantageous embodiment. In FIG. 7, a diagram of a building is depicted in accordance with an advantageous embodiment. In this example, image 700 is illustrated as an example of one manner in which an image may be manipulated using an advantageous embodiment. In this example, image 700 includes building 702 with tower 704 located on roof 706.

In this illustrative example, horizontal controls 708 and vertical control 710 are present. Horizontal controls 708 include left and right control 712 and front and back control 714. These two controls may be associated with horizontal directions within a scene. These horizontal directions may be, for example, X and Y axes. Vertical control 710 may be associated with vertical directions such as in a Z direction in the scene.

These controls may be used to manipulate cursor 716. These controls control movement of cursor 716 relative to the scene as opposed to within image 700. Left and right control 712 has left button 718 and right button 720. Front and back control 714 has front button 722 and back button 724. Manipulation of these buttons may move cursor 716 horizontally in a scene. In these illustrative examples, left button 718 and right button 720 move cursor 716 to the left and right in image 700. Front button 722 and back button 724 move cursor 716 down and up in image 700, and represent scene directions towards or away from the viewer. Cursor 716 moves along path 732 in image 700. A similar path of scene locations is calculated to reflect cursor 716's motion. Each scene path location is calculated to have a base location in the scene corresponding to cursor 716 position on path 732. In other illustrative examples, the cursor moves with respect to cardinal directions in the scene depicted in image 700. Cardinal directions are north, south, east, and west directions and are used for geographic orientation. In FIG. 7, right button 720 and back button 724 are highlighted to illustrate the use of those two controls for the movement on path 732.

Vertical control 710 has up button 726 and down button 728. Manipulation of these buttons may move cursor 716 vertically within a scene depicted in image 700. In this example, cursor 716 begins at point 730 in image 700.

In some advantageous embodiments, these controls may be displayed with image 700 on a display device. With this type of implementation, horizontal controls 708 and vertical control 710 may be controlled through the use of a cursor controlled by a pointing device. In other advantageous embodiments, horizontal controls 708 and vertical control 710 may be physical buttons on a display device. In yet other advantageous embodiments, these controls may be manipulated by an operator through a touch screen interface on the display device.

The illustration of these controls is not meant to limit the manner in which other controls may be implemented. For example, in yet other advantageous embodiments, the controls may be part of a pointing device or may be manipulated through a keyboard without requiring presentation on a display.

Manipulation of horizontal controls 708 causes cursor 716 to move from point 730 in the direction of arrow 733 to point 734. This movement of cursor 716 is a horizontal movement with respect to ground 736 in these examples. In this example, the movement of cursor 716 from point 730 to point 734 may be performed in a base mode to obtain base or ground location information. In this example, base marker 738 is displayed on image 700 at base 740 of building 702.

In FIG. 8, a diagram illustrating vertical movement in a scene is depicted in accordance with an advantageous embodiment. In this example, vertical control 710 is manipulated to move cursor 716 in the direction of arrow 800 up side 802 of building 702 to point 804 of window 805. Up button 726 is highlighted to illustrate use of this control for vertical movement. The movement of cursor 716 from point 734 to point 804 occurs in a vertical offset mode using vertical control 710 in these examples.

In this example, window 805 does not have a corresponding elevation for the particular location in a model of the scene. The displacement or offset from the location of base marker 738 may be used to identify a location in the scene for window 805 in these examples.

The movement of cursor 716 to point 734 on ground 736 provides a location at base 740 of building 702. Although base 740 of building 702 may have a location in which X, Y, and Z coordinates have values, other parts or features on building 702 do not have values for height. For example, window 805 does not have a location in a model of the scene. In other words, a registration of window 805 in image 700 to a scene is not present in this example.

The location for window 805 may be identified in accordance with an advantageous embodiment. In this example, base marker 738 is located at base 740 of building 702 below window 805. Point 734 may be used to identify horizontal coordinate information with respect to the location of window 805 in the scene. The elevation information associated with point 734 in the model of the scene corresponds to base 740, rather than window 805. In these examples, the horizontal coordinate information may be identified as X and Y coordinates, while the elevation may be referred to as a Z coordinate. The height of window 805 may be identified using a vertical displacement from point 734 to window 805.

A selection of point 804 in window 805 results in identification of displacement 806 from point 734 to point 804. Displacement 806 is a vertical displacement in these examples. Point 805 has X and Y coordinates that correspond to point 734. The Z coordinate of window 805 may be identified by displacement 806 from point 734 to point 806 in the vertical direction. This displacement may be added to the elevation of point 734 on ground 736 at base 740 of building 702 to identify a location in the mode of the scene for window 805.

In this manner, a location for a feature not present in an elevation model may be identified from other features having locations identified in the elevation model that are vertically offset from the desired feature. In other words, features above or below the feature of interest having locations in an elevation model may be used to identify a location for the desired feature.

Figure 11:
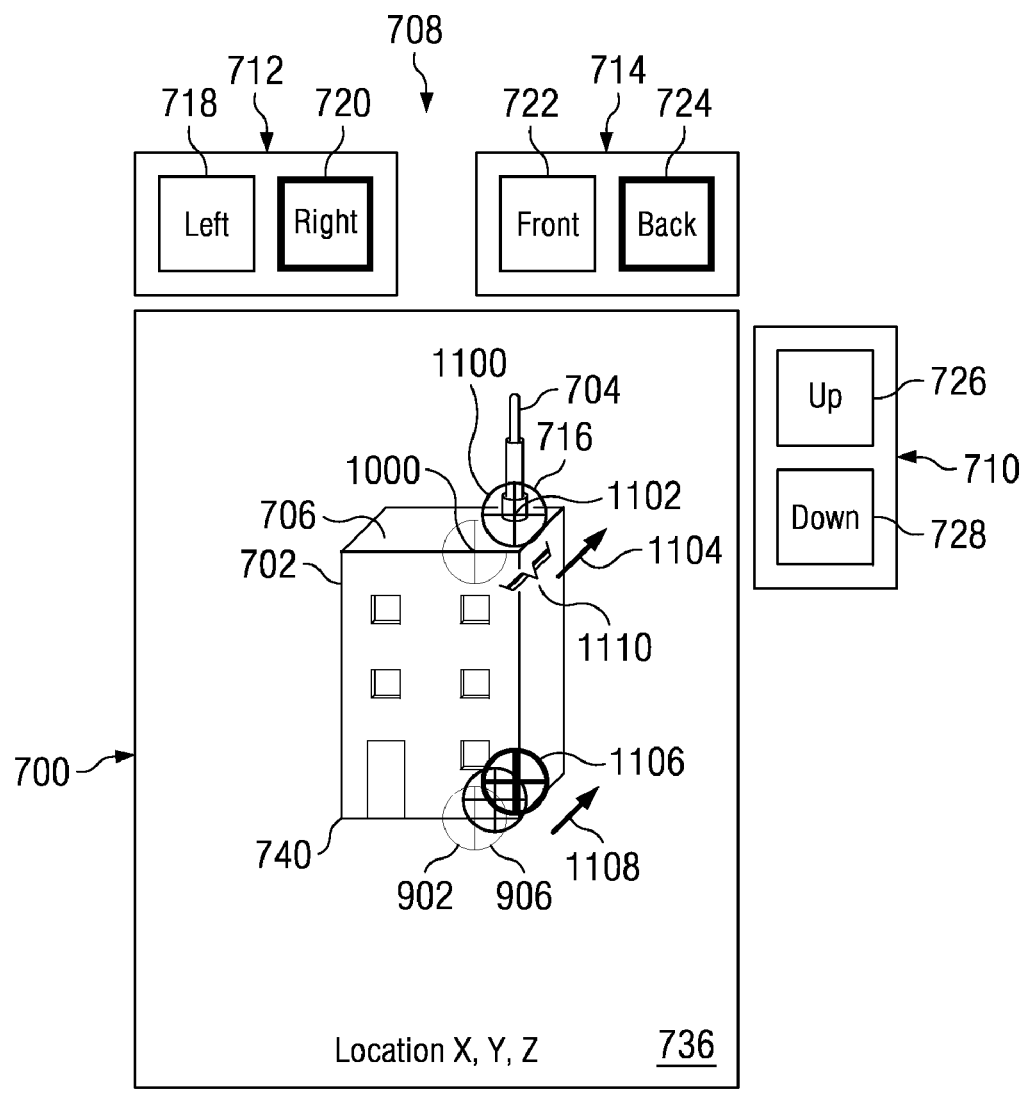
FIG. 11 is a diagram illustrating horizontal and vertical movements in an image in accordance with an advantageous embodiment.

With reference now to FIGS. 9-11, diagrams illustrating horizontal and vertical movements in an image are depicted in accordance with an advantageous embodiment.

In this example, cursor 716 is moved from point 900 to point 902 in image 700 along the direction of arrow 904 to base 740 of building 702. As seen in this example, this movement is performed in a base mode. In this mode, cursor 716 is moved using horizontal controls 708. Base marker 906 is displayed at point 902 in this example. Base marker 906 has a location in a scene that corresponds to point 902 in image 700.

In FIG. 10, cursor 716 is moved from point 902 to point 1000 in the direction of arrow 1002. This movement is performed in a vertical offset mode using vertical control 710. In FIG. 10, displacement 1004 is identified between point 902 and point 1000. Displacement 1004 may be scaled to a displacement within a scene. This displacement may be used to identify a location in the model of the scene for point 1000.

In FIG. 11, cursor 716 moves from point 1000 to point 1100 at base 1102 of tower 704 in the direction of arrow 1104. This movement of cursor 716 occurs in a horizontal offset mode using horizontal controls 708. In this mode, base marker 906 also moves horizontally from point 902 to point 1106 along the direction of arrow 1108. In this example, base marker 906 may move to provide a viewer the capability to visualize the displacement.

The location of point 1100 in a model of a scene may be identified using displacement 1110. This displacement or offset in image 700 may be scaled to identify an offset within the scene. This offset may be used to identify the location of point 1100.

With reference now to FIGS. 12 and 13, a diagram illustrating measuring a point in a tilted image is depicted in accordance with an advantageous embodiment. In this example, image 1200 shows tower 1202 in a tilted view of a scene. Tower 1202 sits on ground 1204 and has antenna 1206.

In this example, cursor 1208 is controlled using a control in the form of mouse 1210. In this example, cursor 1208 begins at point 1212 and moves to point 1214 along the direction of arrow 1216 in response to movement of mouse 1210 in the direction of arrow 1218.

This movement is in a horizontal base mode. This mode may be activated by selecting button 1220 twice in this example. Of course, in other advantageous embodiments, the selection of this and other modes may be performed using other numbers of presses of button 1220, button 1222, and/or other controls or types of input.

In this example, point 1214 has been selected as a base point. Base marker 1224 is displayed at base 1226 of tower 1202. Base marker 1224 identifies where a location in a scene has been obtained for image 1200. This location may be used to obtain a location for another point in the image which does not have a corresponding location in the scene.

Next, in FIG. 13, a vertical mode is activated by selecting button 1220 once in this example. Movement of mouse 1210 in the direction of arrow 1300 results in cursor 1208 moving from point 1214 to point 1302, which may be located at and/or around antenna 1206 in the direction of arrow 1304. Even though arrow 1300 may not be in a straight line, the movement of cursor 1208 is in a straight line as indicated by arrow 1304. This type of movement occurs because only vertical movement occurs in this mode.

Figure 14:
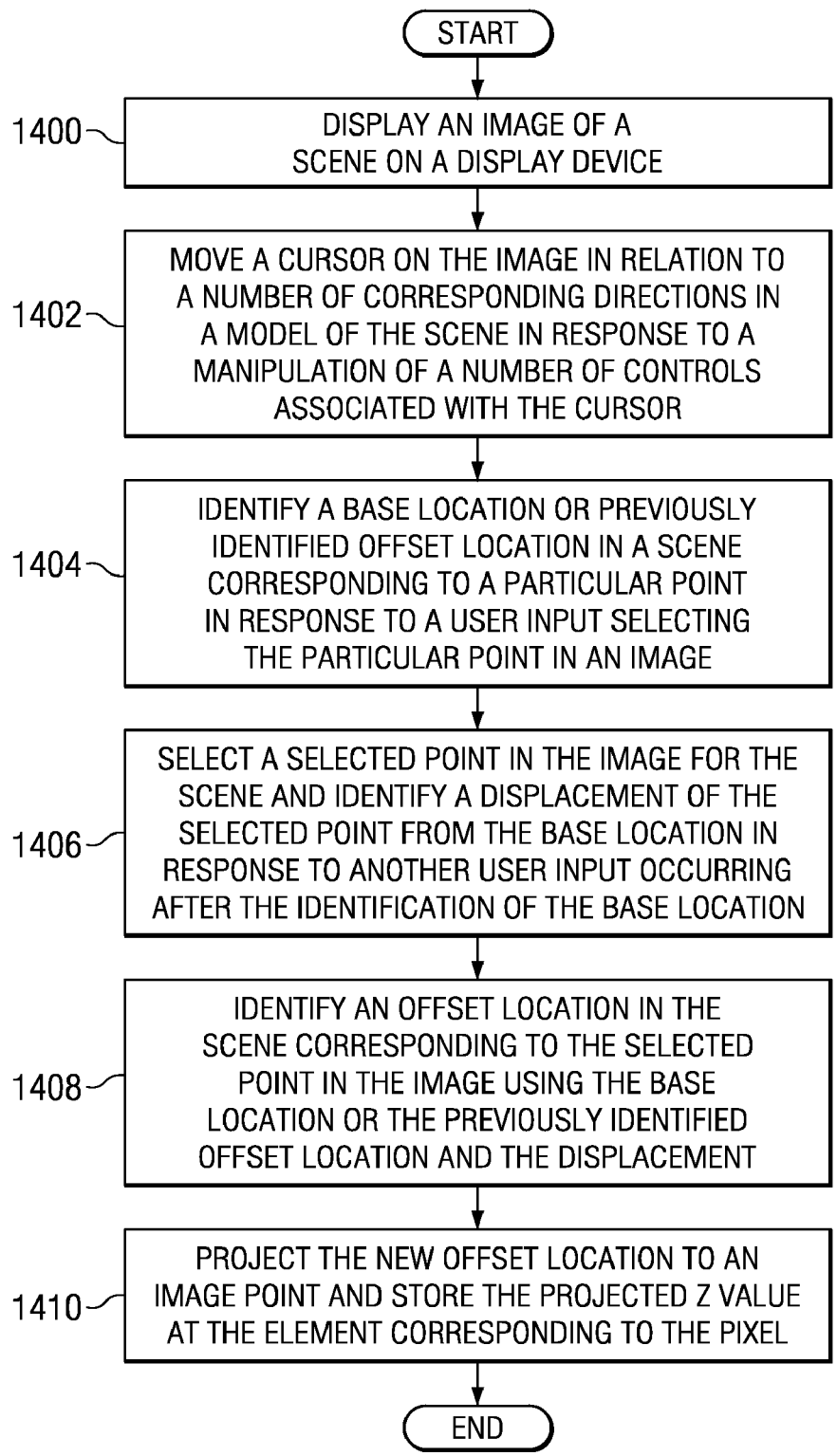
FIG. 14 is a flowchart of a process for identifying a location in a scene in accordance with an advantageous embodiment.

With reference now to FIG. 14, a flowchart of a process for identifying a location in a scene is depicted in accordance with an advantageous embodiment. The process illustrated in FIG. 14 may be implemented in an image processing environment such as, for example, image processing environment 300 in FIG. 3. In particular, this process may be implemented in location identification process 318 in FIG. 3.

The process begins by displaying an image of a scene on a display device (operation 1400). The process then moves a cursor on the image in relation to a number of corresponding directions in a model of the scene in response to a manipulation of a number of controls associated with the cursor (operation 1402). The movement of the cursor is in terms of rows and columns with respect to the image. The movement corresponds to directions in a model of the scene.

For example, if the movement of the cursor is in base mode, a current point of the cursor in the image may be identified and inversely projected to obtain a location on a surface of a base in the scene. The location on the surface of the base in the scene may be projected to obtain an associated point in the image, and the cursor may be moved to the associated point in the image.

As another example, if the movement of the cursor is in a horizontal fashion, the horizontal movement is identified based on horizontal directions in the model. For example, if the cursor is moved from one horizontal location to a second horizontal location, the identification of the point on the image that corresponds to the second horizontal location is identified. The cursor is moved to that point on the image. In other words, any cursor movement can be seen on the display as being horizontal in the model. The scene location corresponding to the cursor position represents the location of the scene element depicted in the pixel at that cursor position. Thus, a right to left movement of the cursor produces a sequence of locations in the scene corresponding to the same path in the scene that the cursor takes in the image.

In a similar fashion, if movement is in a vertical direction in the model from one vertical location to another vertical location, the new vertical location is identified in the model and that corresponding point on the image is the point to which the cursor is moved. Cursor movements in a scene vertical direction follow in a track in the image whose corresponding location sequence in the scene is along the vertical direction. Hence, if a tilted image is viewed, the cursor controls should be operated to move the cursor in an angular path which is tilted to follow the desired vertical path in the scene. In other words, the cursor should trace out a line in the image that depicts a scene vertical direction.

In the vertical motion, however, the cursor is constrained to a vertical line in scene coordinates. That is, the sequence of scene locations corresponding to pixels under the cursor in the image should all fall in a vertical line in scene coordinates. The cursor, in this instance, is constrained to be placed on the corresponding sequence of pixels in the image. However, cursor control will allow variance of cursor motion control inputs from this line, and only the components of control inputs directing cursor motion along the image line of vertical scene movement will cause cursor motion. The cursor motion is created, in these examples, by projecting the vertical location changes back to image coordinates.

In some cases, the manipulation of the cursor may move the cursor in a direction that corresponds to a direction in the model where the model does not have a location, or the model location is inaccurate. The user is expected to recognize when cursor movement is to an image position where the model is or may be inaccurate. The recognition occurs because of knowledge the user has concerning the elevation database and its potential failures to properly represent locations in the scene.

These advantageous embodiments may allow the user to move a cursor from an image pixel position corresponding to a known scene location to a pixel position corresponding to a scene location that is not expected to be accurately represented in the model. The advantageous embodiments record the relative position change in order to establish an accurately known location for the pixel which previously was not accurately represented in the model.

In response to a user input selecting a particular point in an image, a base location or previously identified offset location in a scene corresponding to the particular point is identified (operation 1404). For example, identifying the base location may include identifying a row and column for the particular point in the image and inversely projecting the row and the column to obtain the base location in the scene. In response to another user input occurring after the identification of the base point, a selected point in the image for the scene is selected and a displacement of the selected point from the base location is identified (operation 1406). An offset location in the scene corresponding to the selected point in the image is identified using the base location or the previously identified offset location and the displacement (operation 1408). The process projects the new offset location to an image point and stores the projected W value at the element corresponding to the pixel (operation 1410), with the process terminating thereafter. The new offset location may be projected to a point in the image, and the projected W value of the projected point may be recorded in an element of the projected W value array corresponding to the row and column location of the projected point in the image, for later use as a previously identified location.

Of course, the different advantageous embodiments may perform multiple movements and select multiple locations in which offsets are identified for each of these locations. These different offsets may be combined to identify a location for a feature in an image that is not present in the model of the scene.

Figure 15:
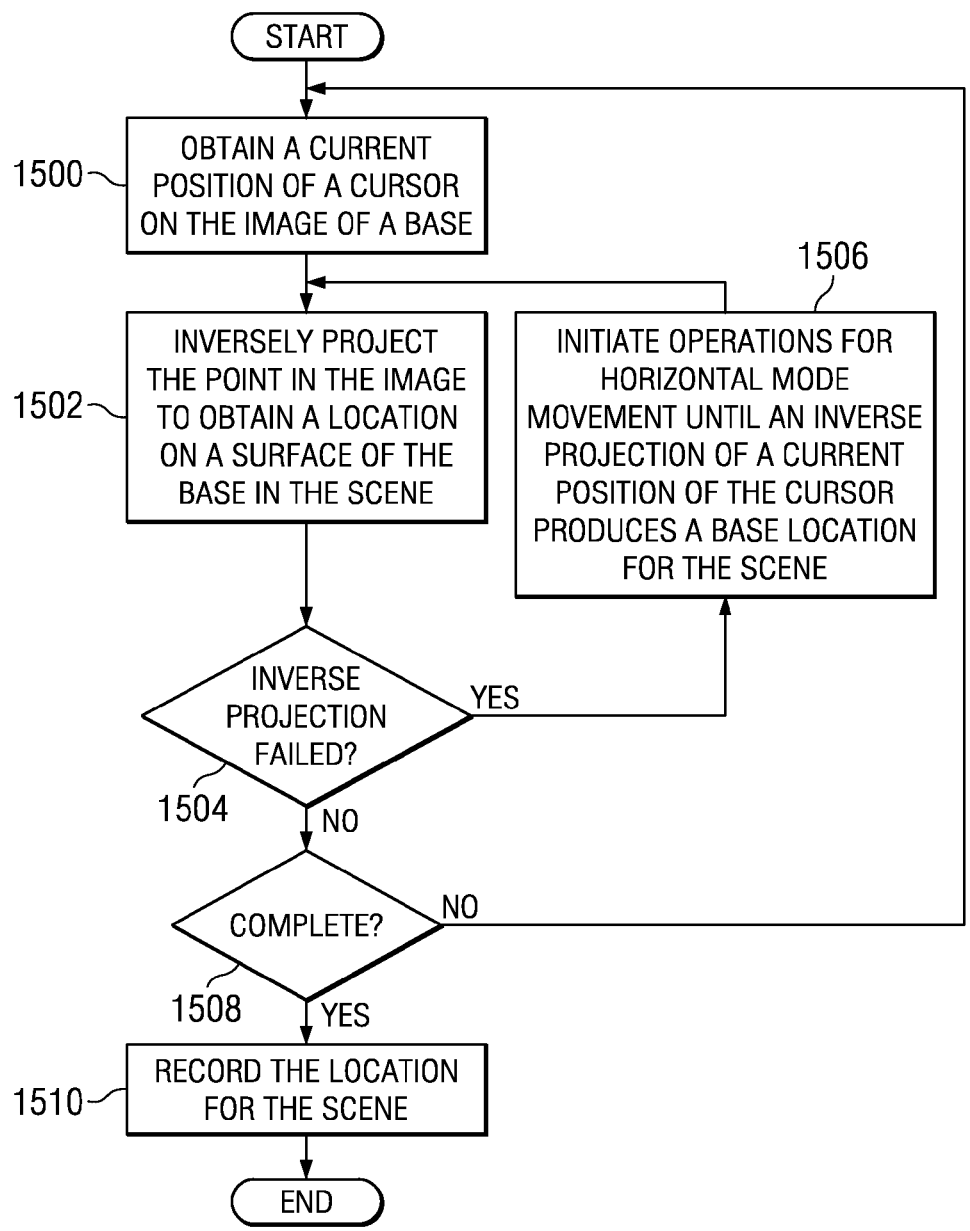
FIG. 15 is a flowchart of a process for a base mode in accordance with an advantageous embodiment.

With reference now to FIG. 15, a flowchart of a process for a base mode is depicted in accordance with an advantageous embodiment. The process illustrated in FIG. 15 is an example of a process that may be implemented in a software component such as, for example, location identification process 318 in FIG. 3. The process illustrated in FIG. 15 is an example of one implementation for base mode 502 in FIG. 5.

The process begins by obtaining a current position of a cursor on the image on a base (operation 1500). The current point of the cursor is identified from the point of the cursor on a display device. This current point may take the form of row and column values. These row and column values identify points corresponding to pixels in these examples.

The process then inversely projects the point in the image to obtain a location on a surface of the base in the scene (operation 1502). In this example, this inverse projection may be a projection of the row and column values, R and C, to obtain X, Y, and Z coordinate values for the location in the scene.

This projection may be performed using three-dimensional projection parameters and three-dimensional inverse projection parameters such as inverse projection parameters 322 in FIG. 3 and a model of the scene such as, for example, model of the scene 326 in FIG. 3.

The inverse projection in these illustrative examples is from two dimensions to three dimensions, while the projection is from three dimensions to two dimensions. In this example, an assumption is made that a projected W value is available for each pixel row and column position, R and C. Each image coordinate point (C,R) may be taken as a projected point (C,R,W) and inverse projected as a three-dimensional point to obtain scene location (X,Y,Z).

A projection is a mathematical transformation that models the image formation process for a sensor. A projection transformation accepts scene coordinates of a location in the scene, typically in three-dimensions X, Y, and Z, and transforms them into image coordinates C, and R, of column index and row index of a pixel in the image. The projection transform also produces a third coordinate value W, which may be called a projected W value. The third dimension of the projected coordinates represents a distance from the image coordinate CR plane to the location (X,Y,Z) which was projected.

In an advantageous embodiment, the third image coordinate may be used with the inverse projection to obtain the location (X,Y,Z) from the projected point (C,R,W) to which the location projects. In another example, the position of the projected pixel (C,R) may be obtained by discarding the third coordinate. In yet another illustrative example, the third image coordinate may be compared to other projected W values to determine which projected location (X,Y,Z) is closest to the image coordinate CR plane, and thereby to be recorded as the pixel intensity for the pixel. These other projected W values may project to the same pixel location (C,R). This latter use is a well known solution for the hidden surface problem in the art of computer graphics display.

Frequently, a projection discards or hides the third dimension coordinate W, and uses only the two C, R coordinate values in the process of modeling the formation of an image of the scene. However, this third dimension coordinate can be retained, or even re-calculated, if needed.

An inverse projection is a mathematical transformation that models the inverse of the image formation process. This inverse projection may be the mathematical inverse of the projection transformation. Inverse projection provides a means to accept pixel C, R coordinates, along with a third dimension coordinate W, and transform them into scene location coordinates X, Y, and Z. The third dimension coordinate W may be obtained from a previously recorded store of projected W values such as the inverse projection parameters 322 in FIG. 3, or W may be recalculated using the three-dimension model of the scene 326.

The inverse projection is often used to determine scene location coordinates corresponding to points of features in the image. A third dimension coordinate W is associated with each column and row coordinate pair (C,R) in order to form a projected point (C,R,W) to make the inverse projection transformation known.

The third dimension coordinate W for a C, R coordinate pair of an image point can be obtained in a number of ways. One illustrative example uses a projected W value from the inverse projection parameters 322 of FIG. 3 for the W coordinate. Use of this method assumes the image registration process 316 in FIG. 3 provides the projected W values for pixels in the image in inverse projection parameters 322 of FIG. 3.

Another common method is to use projection parameters such as projection parameters 324 from FIG. 3 to calculate an intersection between a line of sight from a pixel in the image, with the surface in a computer three-dimensional model of the scene, such as model of scene 326 in FIG. 3. This approach is available in the commercially available OpenGL graphics processing systems.

Next, a determination is made as to whether the inverse projection has failed (operation 1504). The inverse projection may fail if the inverse projection is made to a location not present in the scene.

If the inverse projection in operation 1502 is to a location that is not within the scene, the inverse projection cannot be performed, because a projected W value is not available for the image point of 1500 at the cursor position. In other words, the scene model does not have a location associated with the cursor point location.

For example, if the cursor is on a pixel in an area showing sky above the base in a perspective image, there will be no location associated with the cursor point. A further example is if the model is incomplete in a portion of the area portrayed in the image, and the cursor point is on a pixel portraying a location that is in the incomplete portion.

Figure 17:
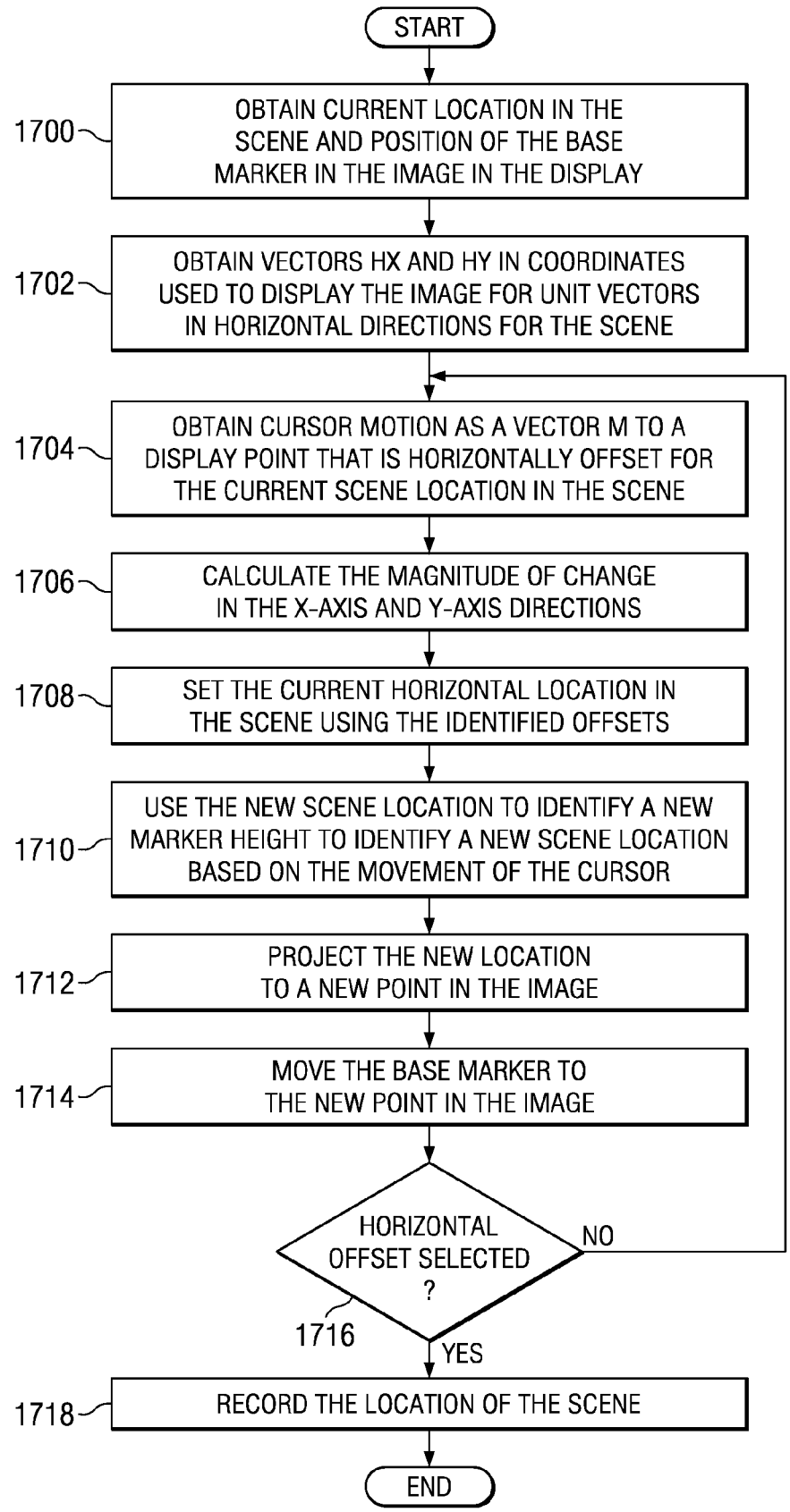
FIG. 17 is a flowchart of a process for a horizontal mode in accordance with an advantageous embodiment.

The process then indicates to the user a switch to horizontal only motion described in FIG. 17 from the base motion process described in FIG. 15, and disallows accepting completion of the process in 1508 until an inverse projection of a subsequent cursor position produces an associated base location from the model.

In operation 1504, if the inverse projection has failed, the process initiates operations for horizontal mode movement until an inverse projection of a current position of the cursor produces a base location for the scene (operation 1506). Horizontal mode movement is described in more detail with respect to FIG. 17, below. The process then returns to operation 1502, as described above.

With reference again to step 1504, if the inverse projection is successful, a determination is then made as to whether the process is complete (operation 1508). The process is not complete if further input is received to move the cursor in the image. If the process is not complete, the process returns to operation 1500. The process may be complete if user input is received to select the associated point on the display as a base.

The process then records the location for the scene (operation 1510) with the process terminating thereafter. The recorded location in operation 1510 forms a scene location. The recorded location in operation 1510 may then be used for various purposes.

For example, the recorded location may be used to position a base marker in the display, to indicate a base location from which an offset location may be identified. In other advantageous embodiments, this recorded location may be used to perform various operations on the particular location in the scene.

Figure 16:
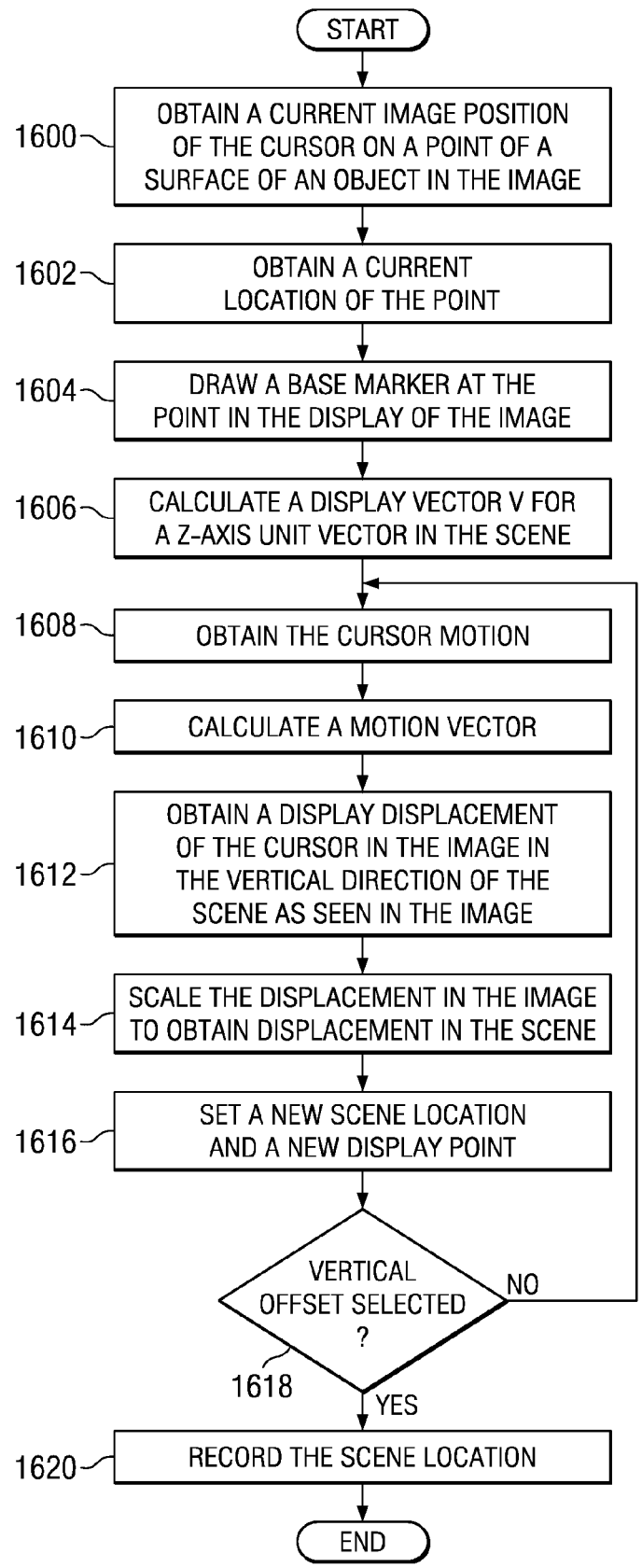
FIG. 16 is a flowchart of a process for a vertical mode in accordance with an advantageous embodiment.

With reference now to FIG. 16, a flowchart of a process for a vertical mode is depicted in accordance with an advantageous embodiment. The process illustrated in FIG. 16 may be executed by a software component such as, for example, location identification process 318 in FIG. 3. This process may be used during a vertical offset mode in which movement of a cursor is performed to identify vertical offset with respect to a base location in a scene. The process illustrated in FIG. 16 is an example of operations that may be used to implement vertical mode 506 in FIG. 5.

The process begins by obtaining a current image position of the cursor on a point of a surface of an object in the image (operation 1600). The point may be given in row and column coordinates, r and c, of the image, and may be identified as (c, r). The motion of a cursor may be obtained based on user input to controls associated with a display device on which the image is presented.

The process then obtains a current location of the point (operation 1602). Operation 1602 is performed by identifying an inverse projection of the point. In this example, the inverse projection may be a projection of the row and column values to obtain coordinate values X, Y, and Z for the location in the scene. The location may be identified as (X, Y, Z).

The process then draws a base marker at the point in the display of the image (operation 1604). The process calculates a display vector v, which if drawn on the image, portrays the appearance of a Z-axis unit vector in the scene (operation 1606).

The display vector v has a direction and length. The direction and length are defined using row and column values. The Z-axis unit vector in the scene is a vertical vector of unit length in this example for the current location. Display vector v is a direction and length of the Z-axis unit vector projected to the image. This relationship may be used to identify a correspondence of offsets in the image relative to offsets in the scene.

For example, if the cursor is moved in a direction and distance in the image, this movement is identified by the motion vector m. The direction and length are defined using row and column values. The length of the motion vector m may be divided by the length of display vector v to obtain the displacement in the scene as a number of units in the Z-axis direction. For example, one meter in the scene may be one pixel of movement in the display. Display vector v is the number of pixels that equals some unit of measure in the scene. For example, display vector v may be the number of pixels that equals one meter in the Z-axis direction in the scene.

The process obtains the cursor motion (operation 1608). The cursor motion may be identified as a change in row and column position, Δr and Δc. The process then calculates a motion vector m (operation 1610). In these examples, the motion vector is identified as m=(Δc, Δr).

The process then obtains a display displacement of the cursor in the image in the vertical direction of the scene as seen in the image (operation 1612). The scene vertical direction may appear in the image at any orientation, depending on how the image may be rotated on the display. The display displacement of the cursor is in the direction of the scene vertical direction appearing in the image.

Operation 1612 may be performed by obtaining a length and a direction. The length may be obtained using a dot product between display vector v and motion vector m, followed by division by the length of display vector v. In this example, s=(m dot v)/|v|.

The direction is obtained by determining a display unit vector in the image in the direction of display vector v. The unit display vector is obtained in this example by dividing the display vector v by the length of display vector v. In this example, the direction is v/|v|. The result of this dot product and division is a length, which also is used as a scale factor in these examples.

The process then scales the displacement in the image to obtain the displacement in the scene (operation 1614). This displacement in the scene may be referred to as ΔZ and identifies the motion above or below the base marker. The displacement may be defined as a scale factor multiplied by the Z-axis unit vector. The scale factor is the length of the display displacement of the cursor obtained in operation 1612. In this example, the displacement in the scene is identified as ΔZ=s.

The process then sets a new scene location and a new display point (operation 1616). Operation 1616 may be performed using parameters such as, for example, inverse projection parameters 322 and projection parameters 324 in FIG. 3. The new scene location is a new vertically offset scene location that is identified as (X, Y, Z+ΔZ). The new display point is identified as (c+Δc, r+Δr). The cursor is moved to the new display point as part of the setting of the new display point in operation 1616 in these examples.

A determination is then made as to whether a vertical offset has been selected (operation 1618). If a vertical offset has not been selected, the process returns to operation 1608. If an offset has been selected, the process records the scene location (operation 1620), with the process terminating thereafter.

With reference now to FIG. 17, a flowchart of a process for a horizontal mode is depicted in accordance with an advantageous embodiment. The process illustrated in FIG. 17 may be implemented in a software component such as, for example, location identification process 318 in FIG. 3. This process may be used during a horizontal offset mode to identify a horizontal offset from a current location in a scene. The process illustrated in FIG. 17 is an example of operations that may be implemented for horizontal mode 504 in FIG. 5.

The process begins by obtaining the current location in the scene and the position of the base marker in the image in the display (operation 1700). The current location in the scene may be identified as (X, Y, Z). The point of the base marker in the image may be identified as $(C_{mark}, R_{mark})$.

The process then obtains vectors hx and hy in coordinates used to display the image for unit vectors in horizontal directions for the scene (operation 1702). These vectors may be identified using parameters such as inverse projection parameters 322 and projection parameters 324 in FIG. 3. Vector hx is a projection into image coordinates of a unit vector in the X-axis direction of the scene, while vector hy is a projection into image coordinates of a unit vector in the Y-axis direction of the scene in this example. These vectors are expressed in row and column coordinates for the image in the display. These vectors are used to correspond offsets for movement in the image to offsets for movement in the scene.

The process obtains cursor motion in row and column coordinates, Δr and Δc, as a vector m to a display point that is horizontally offset for the current scene location in the scene (operation 1704). Vector m is identified as m=(Δc, Δr). This vector is a displacement from the current point in the image.

The process calculates the magnitude of change in the X-axis and Y-axis directions for the cursor motion vector (operation 1706). These magnitudes represent the horizontal offset in the scene. The change in the X-axis direction is represented by vector hx, while the change in the Y-axis direction is represented by vector hy. The magnitudes of these changes are calculated as ΔX=(m dot hx)/|hx| and ΔY=(m dot hy)/|hy|. The process then sets the current horizontal location in the scene using the identified offsets (operation 1708). In this example, the new location may be $(X_{new}, Y_{new}, Z)$=(X+ΔX, Y+ΔY, Z).

The process then uses the new scene location to identify a new marker height to identify a new base marker location based on the movement of the cursor (operation 1710). The Z value representing the height may be obtained from a geocoded elevation database that provides Z values for different X and Y values. For example, geocoded elevation database 328 and three-dimensional scene model 326 in FIG. 3 may be used to obtain a new Z value $Z_{base}$ for a base location at horizontal location $(X_{new}, Y_{new})$. The new base marker location has location $(X_{new}, Y_{new}, Z_{base})$. In these examples, the Z values may be elevation values, while the X and Y values may be longitude and latitude values.

The process then projects the new base marker location to a new point in the image (operation 1712). This projection in operation 1712 is performed using parameters such as, for example, inverse projection parameters 322 and projection parameters 324 in FIG. 3. Operation 1712 identifies a new point in the image that corresponds to the new base marker location in the scene.

The process then moves the base marker to the new point in the image (operation 1714). A determination is made as to whether a horizontal offset has been selected (operation 1716). If a horizontal offset has not been selected, the process returns to operation 1704. Otherwise, the process records the location of the scene (operation 1718), with the process terminating thereafter.

Figure 18:
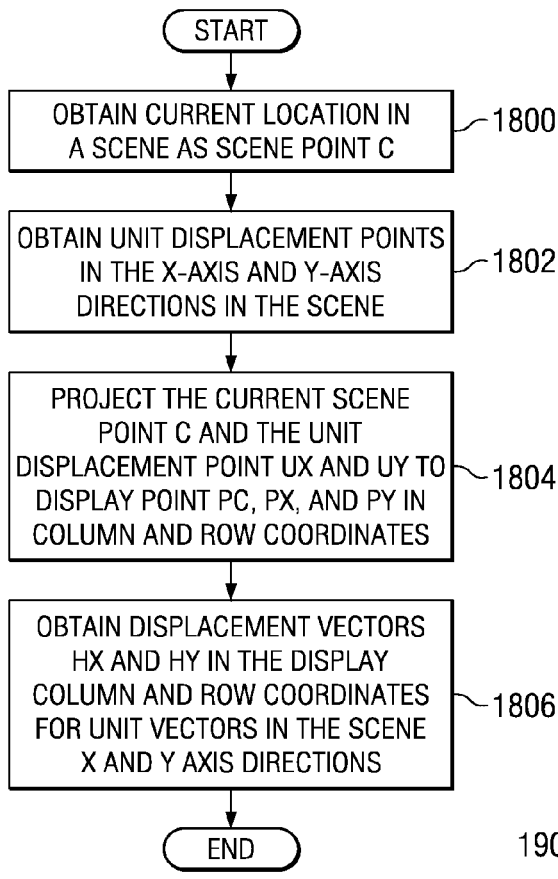
FIG. 18 is a flowchart of a process for obtaining vectors for X-axis and Y-axis directions in accordance with an advantageous embodiment.

With reference now to FIG. 18, a flowchart of a process for obtaining vectors for X-axis and Y-axis directions is depicted in accordance with an advantageous embodiment. The process illustrated in FIG. 18 is a more detailed illustration of operation 1702 in FIG. 17.

The process begins by obtaining the current location in a scene as scene point C (operation 1800). In these examples, the location is expressed in X, Y, and Z coordinates, and scene point C is represented as (Xc,Yc,Zc).

The process then obtains unit displacement points in the X-axis and Y-axis directions in the scene (operation 1802). These displacement points may be uX=(Xc+1,Yc,Zc) and uY=(Xc,Yc+1,Zc). The process then projects the current scene point C and the unit displacement points uX and uY to display points pC, pX, and pY in column and row coordinates (operation 1804). The display points pC, pX, and pY may be identified as follows: $pC=(C_c, R_c)$, $pX=(C_x, R_x)$, and $pY=(C_y, R_y)$.

The process then obtains displacement vectors hx and hy in the display column and row coordinates for unit vectors in the scene X and Y axis directions (operation 1806), with the process terminating thereafter. In this example, hx and hy may be represented as follows: $hx=pX-pC=(C_x-C_c, R_x-R_c)$ and $hy=pY-pC=(C_y-C_c, R_y-R_c)$.

Figure 19:
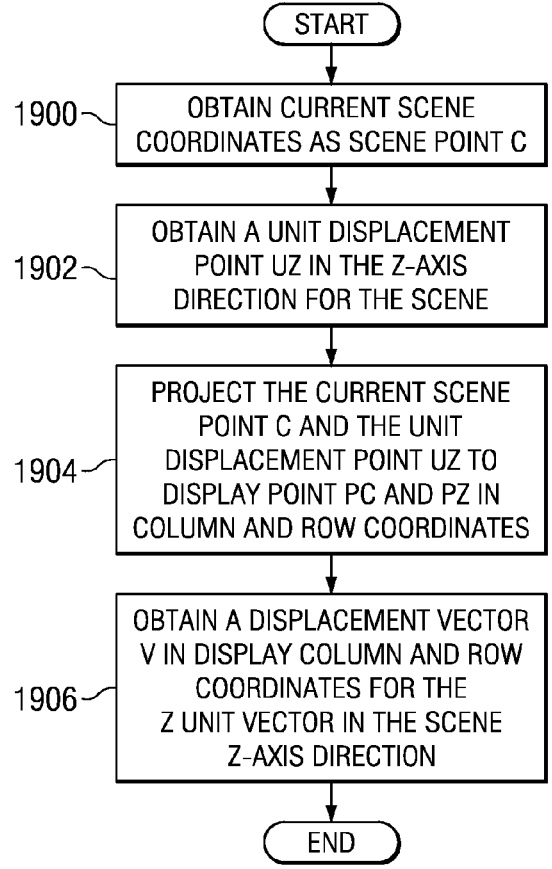
FIG. 19 is a flowchart for obtaining a display vector v for a Z-axis unit vector in a scene in accordance with an advantageous embodiment.

With reference now to FIG. 19, a flowchart for obtaining a display vector v for a Z-axis unit vector in a scene is depicted in accordance with an advantageous embodiment. The process illustrated in FIG. 19 is a more detailed explanation of operation 1606 in FIG. 16.

The process begins by obtaining current scene coordinates as scene point C (operation 1900). Scene point C may be represented as (Xc,Yc,Zc). The process then obtains a unit displacement point uZ in the Z-axis direction for the scene (operation 1902). In the depicted example, uZ may be represented as follows: uZ=(Xc,Yc,Zc+1).

The process then projects the current scene point C and the unit displacement point uZ to display points pC and pZ in column and row coordinates (operation 1904). The display points pC and pZ may be identified as follows: $pC=(C_c,R_c)$ and $pZ=(C_z,R_z)$. The process then obtains a display displacement vector v in display column and row coordinates for the Z unit vector in the scene Z-axis direction (operation 1906), with the process terminating thereafter. The Z unit vector may be represented as follows: $Z=pZ-pC=(C_z-C_c, R_z-R_c)$.

Figure 20:
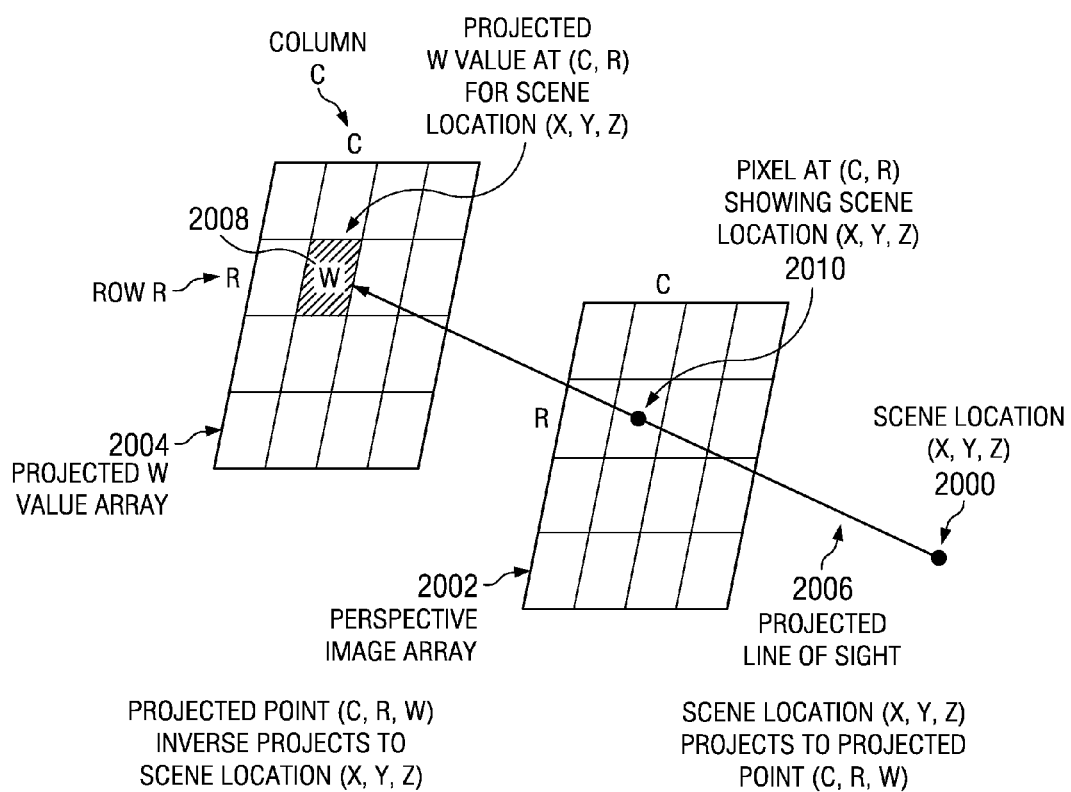
FIG. 20 is a diagram illustrating a relationship between a scene location and the projection to a perspective image and a projected value array in accordance with an advantageous embodiment.

Turning now to FIG. 20, a diagram illustrating a relationship between a scene location and the projection to a perspective image and a projected value array is depicted in accordance with an advantageous embodiment. In this example, a relationship is illustrated between scene location 2000 and the projection of scene location 2000 to perspective image array 2002 and to projected W value array 2004. In this example, scene location 2000 may be identified using coordinates X, Y, and Z. Perspective image array 2002 may contain pixels. A pixel is identified using column and row coordinates, C and R. Projected W value array 2004 may contain projected W values. A projected W value is identified using column and row coordinates C, and R. R and C represent row and column indices of positions in the image array and in the projected W value array. In these examples, W represents a distance from perspective image array 2002 to scene location 2000.

Projected W value array 2004 contains projected W values for each pixel in perspective image array 2002. In other words, for each pixel in perspective image array 2002 having a C and R position index, an entry is present in projected W value array 2004 at that same column and row position that may contain a projected W value for a scene location. Projected W value array 2004 may store information about projected distance to scene location 2000 in accordance with an advantageous embodiment. Projected W value array 2004 may be initially empty or filled in with projected W values.

Projected line of sight 2006 depicts a line of sight from scene location 2000 to projected point 2008, and through pixel 2010 at position (C,R) in the image. Pixel 2010 at position (C,R) in perspective image array 2002 depicts the portion of the scene at scene location 2000. Projected line of sight 2006 models a light ray passing from that scene location into the sensor and being recorded in the sensor image at point 2010.

The projection of scene location 2000 obtains projected point (C,R,W). In this example, W is the projected W value. The projected W value may be retained in projected W value array 2004 for later use in the inverse projection of the corresponding pixel 2010 at point (C,R), or for other purposes.

Multiple scene locations may project to the same pixel. However, only the one location projecting to the pixel and corresponding to the scene location closest to the sensor may be retained. Other locations projecting to the pixel represent scene locations obscured from the sensor view by scene content at the closest location. For example, the projected W value with the smallest value may represent the location closest to the sensor. The test of smallest value may be used for a projection in an advantageous embodiment, which obtains projected W values as negative numerical quantities that increase negatively as location distance from the sensor increases. Other projections may require other numerical tests for closest location. It is important that sufficient numerical precision be provided in the projected W value array to provide suitable accuracy in calculating the inverse projection.

Values for entries in the projected W value array may be established by using the projection transform. The filled array may be obtained from the registration process. Alternatively, the array may be completed by the advantageous embodiment by employing the projection portion of the image registration. The array of projected W values may be a portion of inverse projection parameters 322 in FIG. 3.

A projected W value in the projected W value array may be replaced if a new scene location (X,Y,Z) is determined for a pixel in the image. A new scene location may be determined by a measurement made in accordance with an advantageous embodiment. Once a new scene location (X,Y,Z) is established for a pixel at position (C,R) in the image, scene location (X,Y,Z) may be projected to obtain the three-dimensional projected point (C,R,W). Then the projected W value may be recorded in the element (C,R) of the projected W value array. The element at the corresponding row and column position (C,R) identified by the projection calculation is associated with pixel (C,R) in the image.

Value replacement may be performed even if the new projected W value is larger in signed magnitude than the value stored in location (C,R) of the projected W value array. For example, a measurement of a new location behind a visible surface in the base may obtain a projected W value of larger value than the projected W value for the base pixel on which the cursor is placed. The larger projected W value indicates the new location is more distant from the sensor than the location presently associated with the pixel. Other projections may require a different numerical test to determine closeness of a location to the image plane.

Value replacement is selected according to a selection control activated by the user. Alternatively, it may be preferred to disallow replacement, or provide a warning indication prior to replacement, in cases where the projected W value has a larger value than the value stored at position (C,R) in the projected W value array.

The inverse projection of a pixel at row and column position (C,R) in the image is done by obtaining from the array of projected W values the projected W value in the (C,R) element of the array. That element of the array corresponds to pixel (C,R). The three-dimensional projected point (C,R,W) is then inverse projected to scene location (X,Y,Z), thus identifying the location with the pixel.

If a projected W value is not available in element (C,R) of the projected W value array, then the pixel at position (C,R) is determined to portray a location in the scene which has no content. For example, this could occur for a pixel depicting a portion of sky past a horizon, or for a pixel depicting a portion of the scene for which no elevation value exists in an incomplete elevation database. If this occurs, no replacement of the element (C,R) in the projected W value array is allowed.

Figure 21:
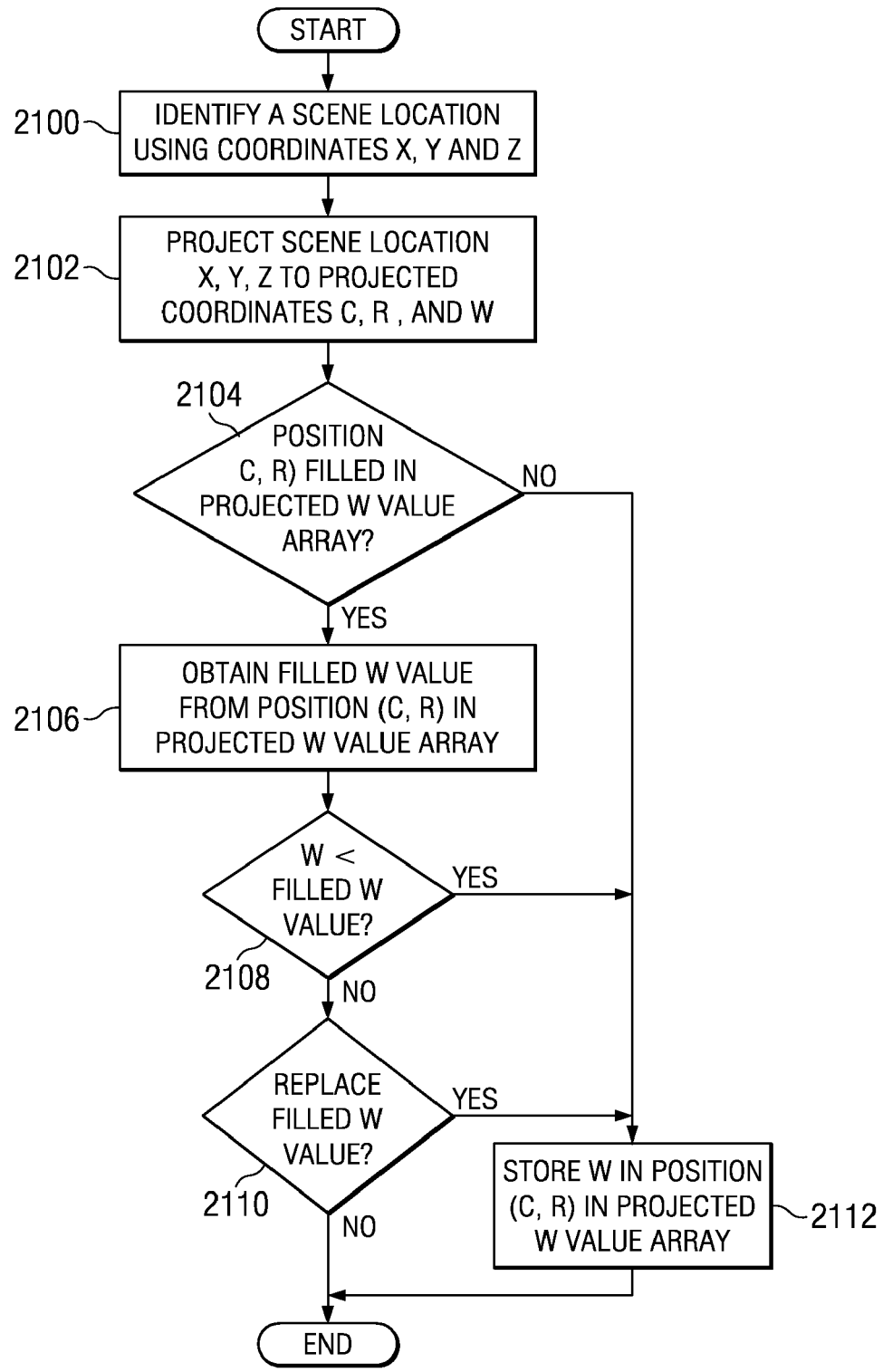
FIG. 21 is a flowchart of a process for generating projected W values in accordance with an advantageous embodiment.

With reference now to FIG. 21, a flowchart of a process for generating projected W values is depicted in accordance with an advantageous embodiment. The process illustrated may be implemented based on the relationships presented in FIG. 20.

The process begins by identifying a scene location having coordinates X, Y, and Z (operation 2100). Scene location (X,Y,Z) with coordinates X, Y, and Z is projected to projected point (C,R,W) having coordinates C, R, and W (operation 2102). A query is made to determine if position (C,R) is filled in the projected W value array (operation 2104). If position (C,R) is not filled, then coordinate W is stored in position (C,R) in the projected W value array (operation 2112), and processing ends. If position (C,R) is filled, then the filled W value is obtained from position (C,R) in the projected W value array (operation 2106).

The process determines whether W is less than filled W value (operation 2108). If W is less than filled W value, then W is stored in position (C,R) in the projected W value array, replacing the filled W value (operation 2112), and processing ends. If W is not less than filled W value, then a further query is made to the user, asking if filled W value should be replaced anyway (operation 2110). A response is obtained from the user, by action of a control responsive to user input. If the response is yes, the value W is stored in position (C,R) in the projected W value array (operation 2112), and processing ends. If the response is no, the filled W value in position (C,R) of the projected W value array is left unchanged, and the process ends.

Thus, the different advantageous embodiments provide a method and apparatus for identifying a location in a scene. An image of the scene is displayed on a display device. A cursor is moved on the image in relation to a number of corresponding directions in a model of the scene. In response to a user input selecting a particular point in the image, a base location in the scene is identified that corresponds to the particular point. In response to receiving the user input occurring after the identification of the base location, a point is selected in the image for the same base location in a direction that is relative to the base location. A displacement is identified from the base location. An offset location in the scene is identified corresponding to the selected point in the image using the base location and the displacement.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a capability to identify locations that are not present in a model of a scene. The different advantageous embodiments may take advantage of commonly available digital elevation models that provide elevation information for many different features. Other features that may not be included in the model may be identified using one or more of the different advantageous embodiments.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a location in a scene, the method comprising:
   displaying an image of the scene on a display device;
   moving a cursor on the image in relation to a number of corresponding directions in a model of the scene in response to a manipulation of a number of displayed controls indicating possible cursor motions;
   responsive to a user input selecting a particular point in the image, identifying a base location in the scene corresponding to the particular point so as to identify a row and a column for the particular point;
   responsive to another user input occurring after identification of the base location, selecting a selected point in the image for the scene, and identifying a displacement of the selected point from the base location; and
   identifying an offset location in the scene corresponding to the selected point in the image using the base location and the displacement.

2. The method of claim 1, wherein the step of identifying the base location in the scene corresponding to the particular point comprises:
   inversely projecting the row and the column to obtain the base location in the scene.

3. The method of claim 1, wherein the step of moving the cursor on the image in relation to the number of corresponding directions in the model of the scene comprises:
   responsive to moving the cursor in a base mode, identifying a current point of the cursor in the image;
   inversely projecting the current point in the image to obtain a location on a surface of a base in the scene;
   projecting the location on the surface of the base in the scene to obtain an associated point in the image; and
   moving the cursor to the associated point in the image.

4. The method of claim 3, wherein the step of moving the cursor on the image in relation to the number of corresponding directions in the model of the scene further comprises:
   displaying a base marker in the image in response to the user input selecting the base; and
   identifying the location as a base location.

5. The method of claim 1, wherein the step of moving the cursor on the image in relation to the number of corresponding directions in the model of the scene comprises:
   responsive to moving the cursor in a vertical mode, identifying a cursor motion in the image;
   identifying a displacement in the image in a vertical direction in the scene from the cursor motion;
   scaling the displacement to form a corresponding displacement in the scene; and
   identifying a new location in the scene using a current location and the corresponding displacement.

6. The method of claim 1, wherein the step of moving the cursor on the image in relation to the number of corresponding directions in the model of the scene comprises:
   responsive to moving the cursor in the image in a horizontal mode, identifying a cursor motion in a number of horizontal axes for the scene from the cursor motion;
   identifying a displacement in the number of horizontal axes; and
   identifying a new location for the scene using the displacement in the number of horizontal axes.

7. The method of claim 1, wherein the number of corresponding directions comprises a number of horizontal directions and a vertical direction.

8. The method of claim 1, wherein the model of the scene is selected from one of a geocoded digital elevation model and a digital terrain elevation database.

9. The method of claim 1, wherein the image is a perspective image of the scene.

10. The method of claim 3, wherein the inversely projecting step and the projecting step are performed using inverse projection parameters and projection parameters.

11. The method of claim 10, wherein the inverse projection parameters include projected W values corresponding to image row and column locations.

12. The method of claim 1 further comprising:
   receiving user input to move the cursor from at least one of horizontal controls and a vertical control, wherein the horizontal controls are capable of moving the cursor on the image relative to a horizontal direction for the model of the scene, and the vertical control is capable of moving the cursor on the image relative to a vertical direction for the model of the scene.

13. The method of claim 1 further comprising:
   storing a projected W value in the number of projected W values for the selected point in the points in the image of the scene using the offset location.

14. An apparatus comprising:
   a display device; and
   a processor configured for displaying an image of a scene on the display device; moving a cursor on the image in relation to a number of corresponding directions in a model of the scene in response to a manipulation of a number of displayed controls indicating possible cursor motions; identifying a base location in the scene corresponding to a particular point so as to identify a row and a column for the particular point, in response to a user input selecting the particular point in the image; selecting a selected point in the image for the scene, and identifying a displacement of the selected point from the base location in response to another user input occurring after identification of the base location; and identifying an offset location in the scene corresponding to the selected point in the image using the base location and the displacement.

15. The apparatus of claim 14, wherein in identifying the base location in the scene corresponding to the particular point, the processor is capable of inversely projecting the row and the column to obtain the base location in the scene.

16. The apparatus of claim 14, wherein in moving the cursor on the image in relation to the number of corresponding directions in the model of the scene, the processor is capable of identifying a current point of the cursor in the image in response to moving the cursor in a base mode; inversely projecting the current point in the image to obtain a location on a surface of a base in the scene; projecting the location on the surface of the base in the scene to obtain an associated point in the image; and moving the cursor to the associated point in the image.

17. The apparatus of claim 16, wherein in moving the cursor on the image in relation to the number of corresponding directions in the model of the scene, the processor is further capable of displaying a base marker in the image in response to the user input selecting the base; and identifying the location as a base location.

18. The apparatus of claim 14, wherein in moving the cursor on the image in relation to the number of corresponding directions in the model of the scene, the processor is capable of identifying a cursor motion in the image in response to moving the cursor in a vertical mode; identifying a displacement in the image in a vertical direction in the scene from the cursor motion; scaling the displacement to form a corresponding displacement in the scene; and identifying a new location in the scene using a current location and the corresponding displacement.

19. The apparatus of claim 14, wherein in moving the cursor on the image in relation to the number of corresponding directions in the model of the scene, the processor is capable of identifying a cursor motion in a number of horizontal axes for the scene from the cursor motion in response to moving the cursor in the image in a horizontal mode; identifying a displacement in the number of horizontal axes; and identifying a new location for the scene using the displacement in the number of horizontal axes.

20. The apparatus of claim 14 further comprising:
a sensor system, wherein the sensor system sends data for the image.

21. The apparatus of claim 20 further comprising:
a platform, wherein the platform is selected from one of a first platform in which the processor and the sensor system are located on the first platform; a second platform in which the processor is located on the platform without the sensor system; and a third platform on which the sensor system is located on the third platform without the processor.

22. The apparatus of claim 21, wherein the platform is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a human operator, and a building.

23. The apparatus of claim 14 further comprising:
a number of horizontal controls capable of moving the cursor on the image relative to a horizontal direction for the model of the scene; and
a number of vertical controls capable of moving the cursor on the image relative to a vertical direction for the model of the scene.

24. A non-transitory computer program product for identifying a location in a scene, the computer program product comprising:
a computer recordable storage medium;
program code, stored on the computer recordable storage medium, for displaying an image of the scene on a display device;
program code, stored on the computer recordable storage medium, for moving a cursor on the image in relation to a number of corresponding directions in a model of the scene in response to a manipulation of a number of controls associated with the cursor;
program code, stored on the computer recordable storage medium, responsive to a user input selecting a particular point in the image, for identifying a base location in the scene corresponding to the particular point so as to identify a row and a column for the particular point;
program code, stored on the computer recordable storage medium, responsive to another user input occurring after an identification of the base location, for selecting a selected point in the image for the scene, and identifying a displacement of the selected point from the base location; and
program code, stored on the computer recordable storage medium, for identifying an offset location in the scene corresponding to the selected point in the image using the base location and the displacement.

* * * * *